(12) United States Patent
Niazi

(10) Patent No.: US 9,792,590 B2
(45) Date of Patent: Oct. 17, 2017

(54) SYSTEM AND FRAMEWORK FOR INSTANT MESSENGER TIMECARD INTEGRATION

(71) Applicant: ORACLE INTERNATIONAL CORPORATION, Redwood Shores, CA (US)

(72) Inventor: Uzair Niazi, San Ramon, CA (US)

(73) Assignee: Oracle International Corporation, Redwood Shores, CA (US)

(*) Notice: Subject to any disclaimer, the term of this patent is extended or adjusted under 35 U.S.C. 154(b) by 237 days.

(21) Appl. No.: 14/029,561

(22) Filed: Sep. 17, 2013

(65) Prior Publication Data

US 2015/0081486 A1 Mar. 19, 2015

(51) Int. Cl.
*G06F 15/02* (2006.01)
*G07C 1/10* (2006.01)
*G06Q 10/10* (2012.01)
*H04L 12/58* (2006.01)
*G07B 17/00* (2006.01)
*G07F 19/00* (2006.01)

(52) U.S. Cl.
CPC ....... *G06Q 10/1091* (2013.01); *H04L 51/046* (2013.01)

(58) Field of Classification Search
CPC .... G06Q 10/10; G06Q 10/06; G06Q 10/1091; G06Q 10/103; G06Q 10/109
USPC ..................................................... 705/30, 32
See application file for complete search history.

(56) References Cited

U.S. PATENT DOCUMENTS

| 5,717,867 A | 2/1998 | Wynn et al. |
| 7,367,491 B2 | 5/2008 | Cheng et al. |
| 2003/0033167 A1* | 2/2003 | Arroyo ............ G06Q 10/06398 705/301 |
| 2003/0204367 A1 | 10/2003 | Hartigan et al. |
| 2003/0204427 A1 | 10/2003 | Gune et al. |
| 2004/0117615 A1* | 6/2004 | O'Donnell .............. G06F 21/10 713/155 |
| 2004/0215610 A1* | 10/2004 | Dixon .................... G06Q 10/10 |

(Continued)

OTHER PUBLICATIONS

Time Guardian Series E a s y - T o - U s e Time and Attendance systems, retrieved from http://www.amano.com/timeweb/PDF/TA% 20Series_B_optimized.pdf, 2011, pp. 1-11.

(Continued)

*Primary Examiner* — Ig T An
(74) *Attorney, Agent, or Firm* — Omkar K. Suryadevara; Silicon Valley Patent Group LLP

(57) ABSTRACT

In an Instant Messenger, a current state that is transmitted to other employees is selectable by user input, to be a first state identifying a given employee as working or a second state identifying the given employee as taking a break. A draft time card is automatically prepared for the given employee, by using a time at which the current state is set in the IM to the first state as a time of occurrence of a clock-in event in tracking time to be paid, or when it is set to the second state as a time of occurrence of a clock-out event. The draft time card is displayed to the given employee and finalized based on additional user input identifying any changes to periods of time in the draft time card, to obtain a finalized time card. The finalized time card is submitted to an accounting system, for payment.

16 Claims, 22 Drawing Sheets

(56) References Cited

U.S. PATENT DOCUMENTS

| | | | |
|---|---|---|---|
| 2005/0010501 A1* | 1/2005 | Ward, Jr. | G06O 40/02 705/30 |
| 2005/0203760 A1* | 9/2005 | Gottumukkala | G06Q 10/06 705/32 |
| 2007/0156741 A1 | 7/2007 | O'Sullivan | |
| 2007/0260730 A1* | 11/2007 | Gadwale | H04L 51/043 709/224 |
| 2008/0045184 A1* | 2/2008 | Randall | H04M 1/576 455/412.2 |
| 2008/0209417 A1* | 8/2008 | Jakobson | G06F 9/4856 718/100 |
| 2008/0250109 A1* | 10/2008 | Jakobson | G06Q 10/107 709/206 |
| 2009/0248552 A1 | 10/2009 | Taylor et al. | |
| 2010/0169421 A1* | 7/2010 | Denner | G06F 15/16 709/204 |
| 2010/0324964 A1* | 12/2010 | Callanan | G06Q 10/06 705/322 |
| 2011/0153477 A1 | 6/2011 | Niazi | |

OTHER PUBLICATIONS

Online or Web-Based Solutions, TimeForce Time & Attendance Software, Nov. 19, 2012, pp. 1-7, retrieved from http://www.mytimeforce.com/time_clocks/type/web-based.

Net Time Clock, TimeForce Time & Attendance Software, Nov. 19, 2012, pp. 1-7, retrieved from http://www.mytimeforce.com/time_clocks/models/net-timeclock.

Synel Time and Attendance Systems, retrieved from http://www.synel.com/brochures/synel-personnel.pdf, Jun. 2010, pp. 1-17.

Kronos webTA for the Federal Government, retrieved from http://www.kronos.com/download/thank-you.aspx?did=1471&rr=0&LangType=1033#, 2010, pp. 1-2.

SAP® ERP Human Capital Management, retrieved from http://www.sap.com/asia/pdf/2011/SAP-ERP_Human_Capital_Management.pdf, 2011, pp. 1-20.

Human resources management in Microsoft Dynamics GP, retrieved from http://www.microsoft.com/dynamics/en/gulf/products/gp-hr-management.aspx, Nov. 19, 2012, pp. 1-2.

Workday Time Tracking, retrieved from http://www.workday.com/Documents/pdf/datasheets/datasheet-workday-time-tracking.pdf, 2012, pp. 1-2.

Infor Enwisen Workforce, retrieved from http://www.infor.com/content/brochures/hcm-workforce-management.pdf/, 2012, pp. 1-4.

Exploring the Effects of Enterprise Instant Messaging Presence Information on Employee Attendance in a Distributed Workforce: An Ethnographic Study of a Large Professional Services Organization, Jul.-Sep. 2012, Abstract (p. 1) and Article (18 pages) retrieved from http://www.igi-global.com/article/exploring-effects-enterprise-instant-messaging/68163, and retrieved from http://papers.ssrn.com/sol3/papers.cfm?abstract_id=2101602.

* cited by examiner

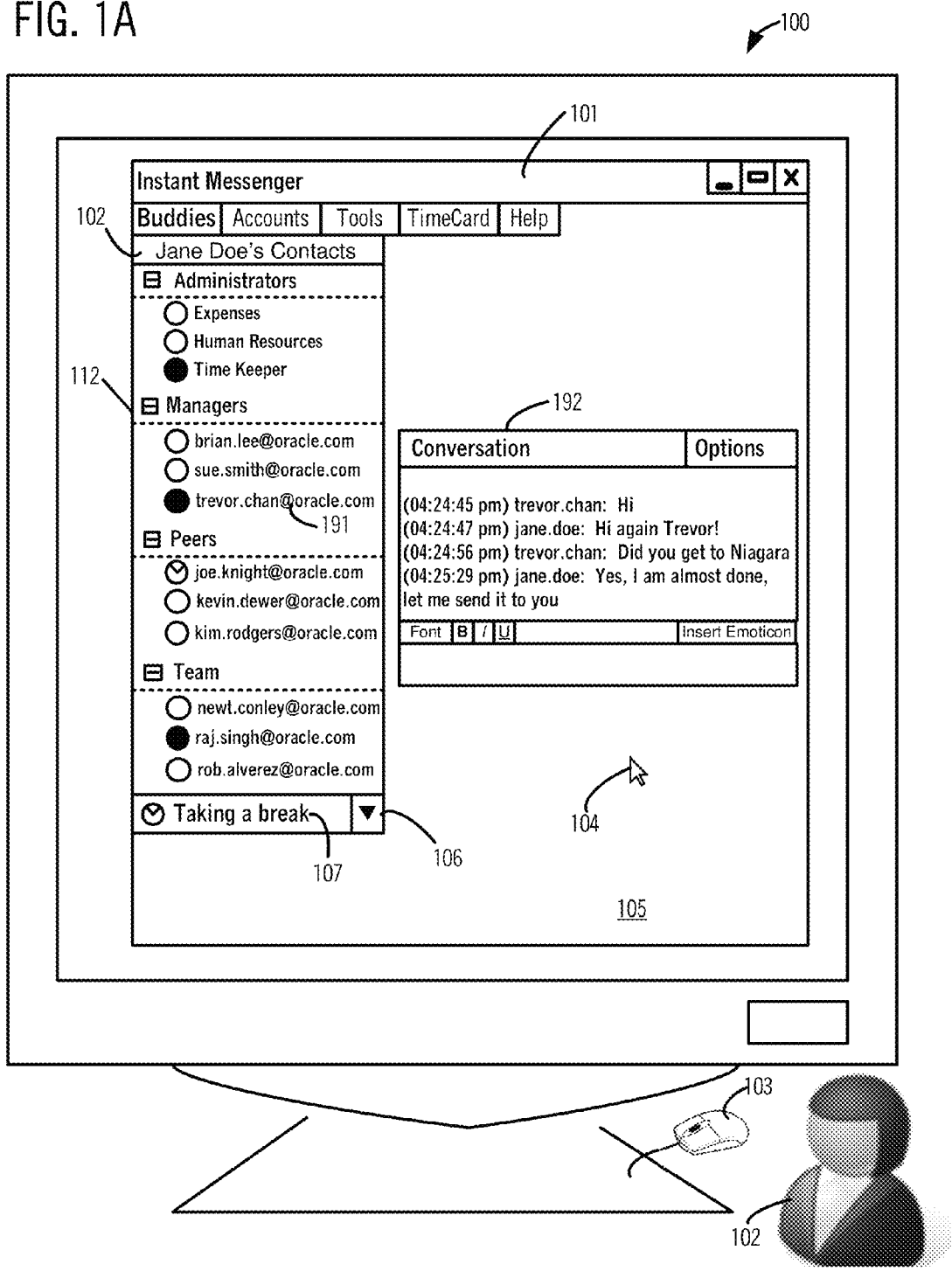

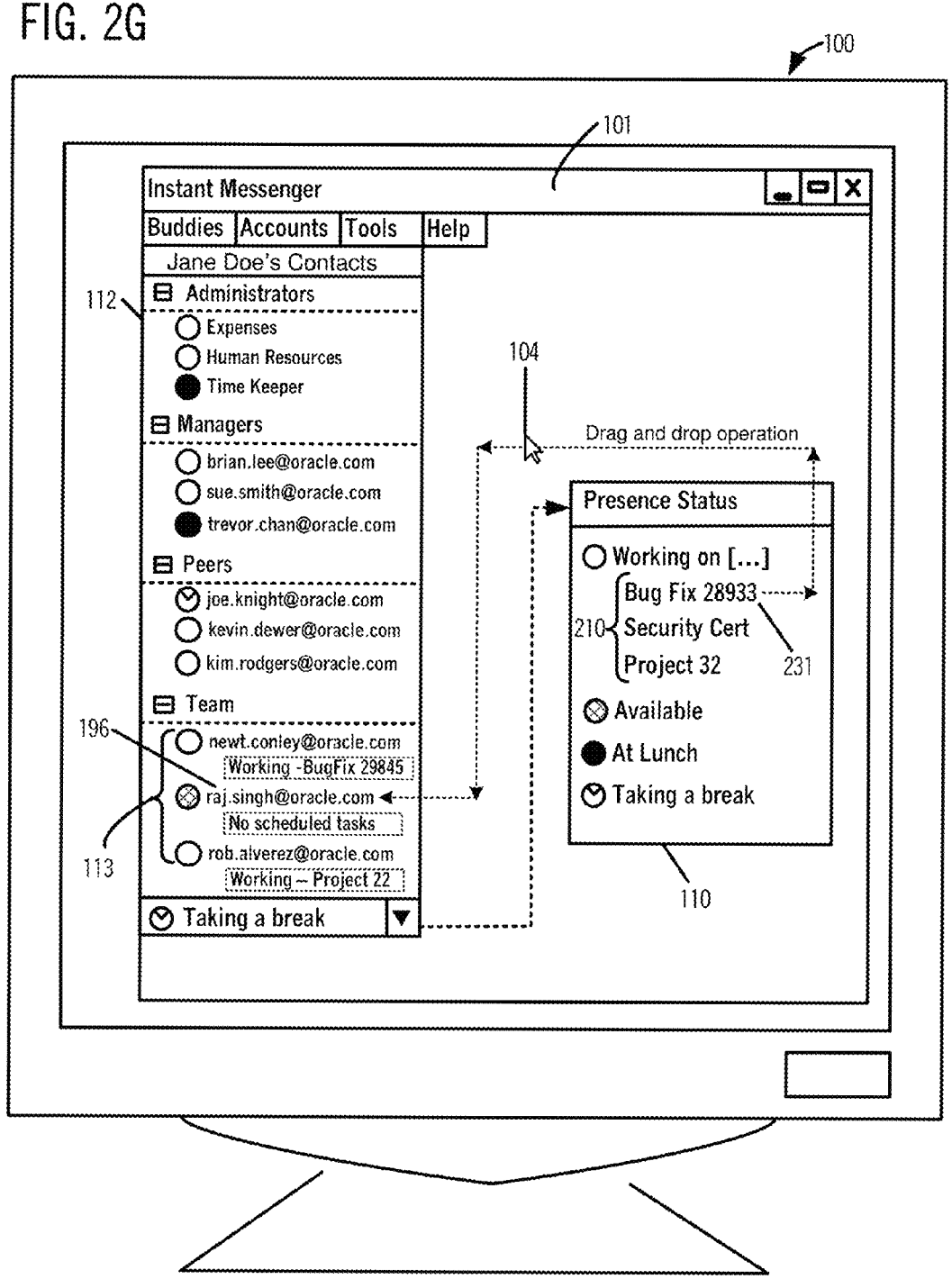

FIG. 3B

| Instant Messenger | Feed generated to Task Management System |
|---|---|
| User selects "Bug 2893386" as the task being started, at 9:02 am on Monday 21st Sept 2012. Task status is updated in Task Status Interface | "Bug 2893386", "21-Sept-2012 09:02:00", "Start", "JoeSmith@Oracle.com" |
| User selects "Completed Bug 2893386" as the task is completed at 10:01 am on Monday 21st Sept 2012. Task status is updated in Task Status Interface | "Bug 2893386", "21-Sept-2012 10:01:00", "Complete", "JoeSmith@Oracle.com" |
| User selects "Security Certification" as the task being started, at 10:02 am on Monday 21st Sept 2012. Task status is updated in Task Status | "Security Certification", "21-Sept-2012 10:02:00", "Start", "JoeSmith@Oracle.com" |
| User selects "Completed Bug 2893386" as the task is completed at 11:01 am on Monday 21st Sept 2012. Task status is updated in Task Status | "Security Certification", "21-Sept-2012 11:01:00", "Complete", "JoeSmith@Oracle.com" |

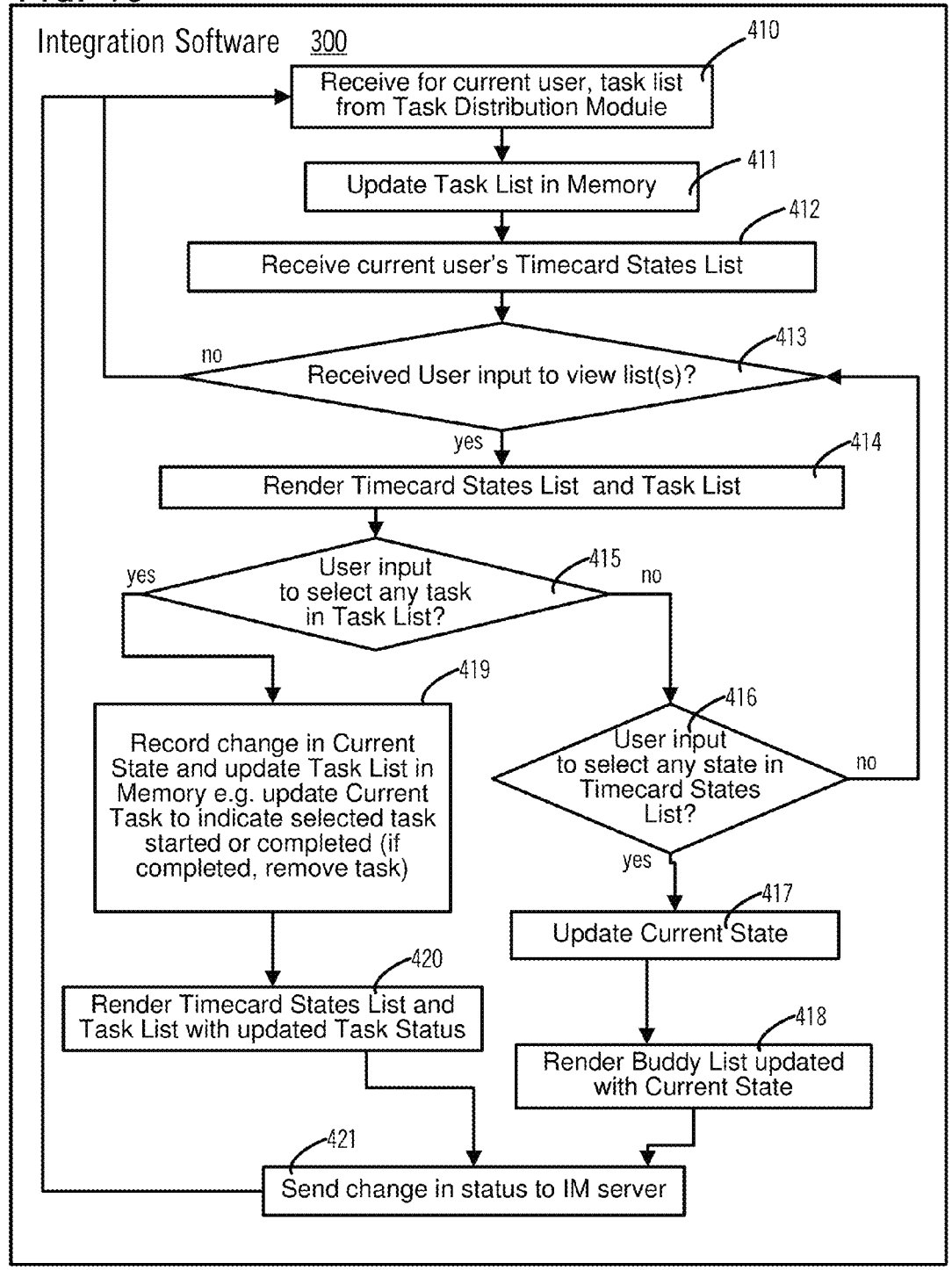

SYSTEM AND FRAMEWORK FOR INSTANT MESSENGER TIMECARD INTEGRATION

BACKGROUND

It is common today for employees to record time during which they have worked for a business or organization in a time card (also called time sheet), which is used to compute and pay salaries. A time card prepared on paper or in spreadsheet software typically has columns for days of the week (M, Tu, W, Th, F, Sa, Su), and rows in which the user can manually enter hours of each day that were spent in work, with one row for each job. Software, such as QuickBooks® available from Intuit Inc. can be used to assist an employee in tracking time spent in working, e.g. via a screen to enter time spent on a single activity, by use of a stop watch (or timer) therein. Such a stop watch can be operated on a screen displayed on a personal computer (PC) in the normal manner, using a "start" button, a "stop" button, and a "pause" button.

US Publication 2010/0324964 is incorporated by reference herein as background. US Publication 2010/0324964 describes an automatic work monitoring system that may be implemented in an instant messaging application so that employee hours can automatically be tracked and associated with projects. The work monitoring system of US Publication 2010/0324964 can determine that an activity is associated with a project based on context of the activity and an employee's work profile. This work monitoring system can determine the amount of time spent on the activity and record the amount of time in a daily work record, which may be used for payroll, billing, etc. The work monitoring system can also update the employee's presence information to indicate that the employee is working on the project, to update the employee's instant messaging contacts about the employees work activity.

US Publication 2003/0204367 is incorporated by reference herein as background. US Publication 2003/0204367 describes automatically tracking time spent by end users in different applications on the end users' computers while performing tasks. The time keeping application is integrated with at least some of the applications on the end user computers. This integration allows the time keeping application to detect and track events, such as the opening and closing of files that signify a change in the task being performed by the end users, by receiving messages directly from the other applications being used by the end user. Reports of timekeepers' activities may be used to generate invoices, which may be generated by the time keeping application itself or which may be used as an input into an accounting application that generates invoices.

A drawback in methods of the type described by US Publication 2003/0204367 and US Publication 2010/0324964 is that an employee's time appears to be recorded indiscriminately. More specifically, in both US Publication 2003/0204367 and US Publication 2010/0324964 it appears that recording of time occurs without user input, e.g. as to whether a specific activity the user is performing is work or personal. So, prior art can benefit by an improvement made by the current inventor, as follows.

SUMMARY

In several aspects of described embodiments, in a method and one or more computer(s), a current state of presence that is transmitted to other employees by an Instant Messenger (IM) is selectable by user input, to be a first state identifying a given employee as working, or a second state identifying the given employee as taking a break. The time when the current state is set to the first state by the user input is recorded as a time of occurrence of a clock-in event in tracking time to be paid, and a subsequent time when the current state is set to the second state by the user input is recorded as a time of occurrence of a clock-out event.

A draft time card is automatically prepared for the given employee, by including a period of work identified by use of the just-described two times of occurrence, specifically of the clock-in event at which the current state is set to the first state by user input received in the IM and the clock-out event at which the current state is set to the second state by the user input. The draft time card is displayed to the given employee, and finalized based on additional user input by the given employee which may identify zero or more changes to the draft time card, resulting in a finalized time card. The finalized time card is then submitted to an accounting system. Submission of the finalized time card may require, in some embodiments, approval by the given employee's manager who is identified in a database of work relationships, although no manager approval is required for the submission in other embodiments. The accounting system then processes payment to the given employee, by using on one or more periods of work identified in the time card to compute salary.

It is to be understood that several other aspects and embodiments will become readily apparent to those skilled in the art from the description herein, wherein it is shown and described various aspects by way of illustration. The drawings and detailed description below are to be regarded as illustrative in nature and not as restrictive.

BRIEF DESCRIPTION OF THE DRAWINGS

FIGS. 1A, 1B, 1C, 1E, 1G illustrate the graphical user interface of an Instant Messenger 101 in accordance with the invention.

FIGS. 2A-2H illustrate the graphical user interface of Instant Messenger 101 in certain embodiments.

FIG. 3B illustrates, in a table, an event that occurs in Instant Messenger 101 (shown in the left column of the table) and a message that is transmitted to workforce management system 130 (shown in the right column of the table) in illustrative embodiments of the invention.

FIGS. 4C and 4D illustrates, in flow charts, acts performed by Instant Messenger 101 in some embodiments.

DETAILED DESCRIPTION

Figure 1B:
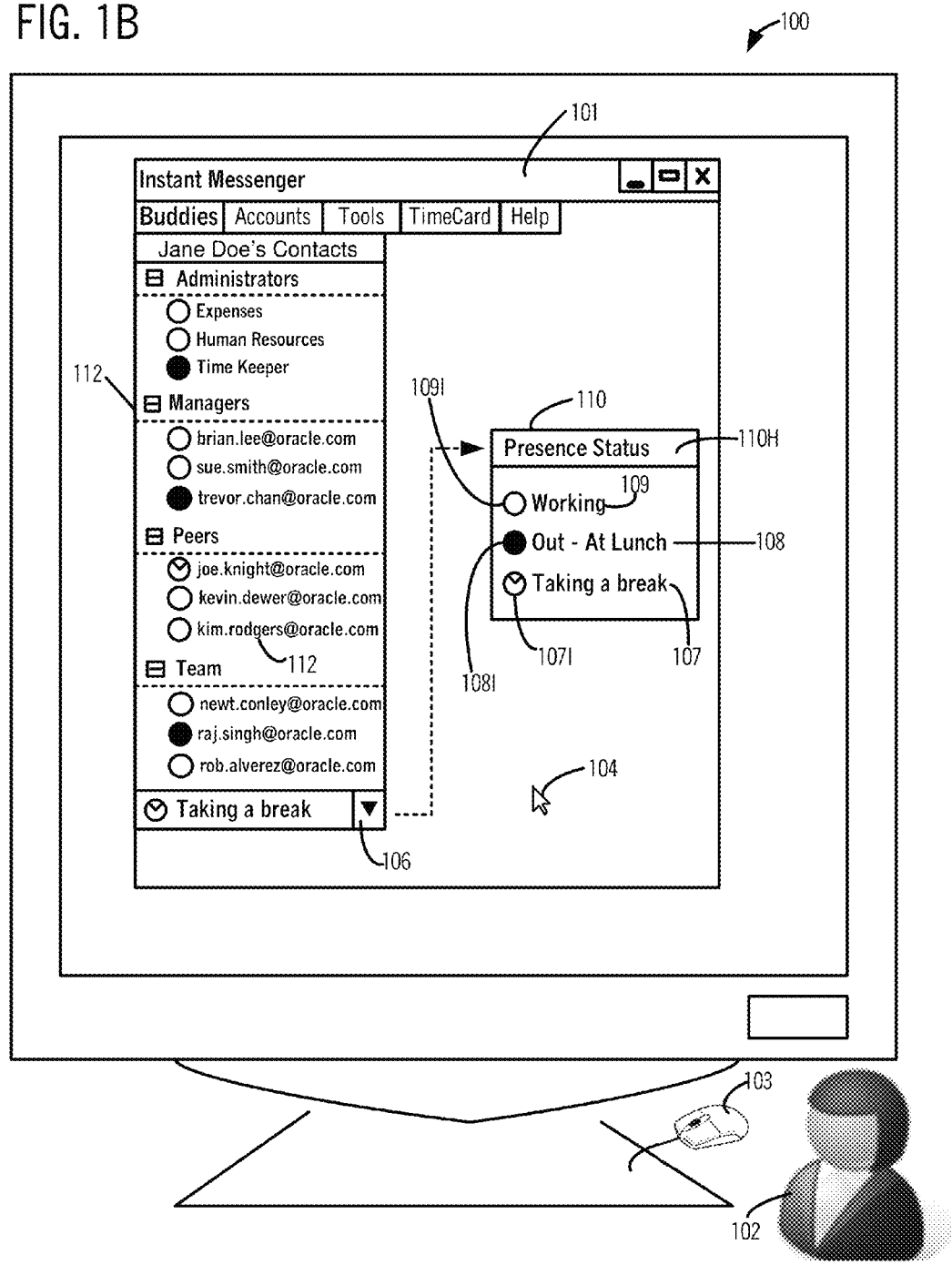

FIG. 1A illustrates an Instant Messenger 101 (also called IM) into which a given employee 102 (e.g. Jane Doe) has logged in e.g. in a computer 100 which may be a desktop computer (such as a Personal Computer or PC) or a mobile device (such as a smartphone, or a laptop computer) depending on the embodiment. Instant Messenger 101 receives login credentials from employee 102 in the normal manner, by receiving, e.g. a user identifier and a password as per act 171 (FIG. 1F). Thereafter, Instant Messenger 101 uses the login credentials in the normal manner, e.g. by supplying them to an IM server 120 (FIG. 1D). Depending on the embodiment, Instant Messenger 101 may additionally use the same login credentials to directly or indirectly log in to a timecard module 131 (FIG. 1D) that generates a timecard for employee 102.

In a direct login process, the same login credentials are provided unchanged to timecard module 131, whereas in an indirect login process the same login credential are used to retrieve from a database additional login credentials that are provided to log in to timecard module 131. In some embodiments, a timecard plugin 190 in Instant Messenger 101 performs the login to timecard module 131. Although in some embodiments Instant Messenger 101 is executed by a computer 100 that belongs to given employee 102 (e.g. Jane Doe), in other embodiments Instant Messenger 101 is executed in a remote computer (such as IM server 120) that is accessed via a browser that itself executes in computer 100.

In some embodiments, as soon as employee 102 logs in, Instant Messenger 101 uses this user input (namely receipt of login id and password) to set the current state. Specifically, in response to login by employee 102, Instant Messenger 101 sets an internal variable 177 (FIG. 1F) in a memory of computer 100 which is indicative of the employee's current state in an organization (such as a business or a non-profit entity), to be a timecard state of working, as per act 172 (FIG. 1F). Similarly, when employee 102 logs out, Instant Messenger 101 uses this user input (namely receipt of a logout command) in a manner similar to the above-described user input to set the current state.

In several such embodiments, Instant Messenger 101 also records a time of log in (or log out) in the memory of computer 100, as a timestamp of when the current state is set. The current state is set in variable 177 with the understanding that a duration for which variable 177 is set to the current state is to be recorded, as a period of work in a time card of employee 102. After logging in to Instant Messenger 101, employee 102 may use a control 106 (FIG. 1A) to select their current state (in variable 177) to be a specific state which is selected from among a predetermined set of states 107-109 (also called timecard states) that are displayed in a list 110 (FIG. 1B), as per act 173 (FIG. 1F).

List 110 (also called "timecard states list") includes, in an illustrative embodiment, a timecard state 109 of working (also called "available"), and two or more non-working timecard states, such as a timecard state 108 of being at lunch and another timecard state 107 of taking a break. In some embodiments, the predetermined set of timecard states 107-109 are hardcoded into timecard plugin 190 in Instant Messenger 101 whereas in other embodiments timecard plugin 190 retrieves timecard states 107-109 from a timecard module 131 (FIG. 1D) after login thereto. Accordingly, as per act 174 (FIG. 1F), Instant Messenger 101 receives user input via control 106 and sets its internal variable 177 (e.g. in a memory of computer 100) indicative of the current state.

In some embodiments, the above-described timecard states (also referred to as activities) are used in Instant Messenger 101 as replacements of conventional "presence" states which indicate availability of a user for a chat session, such as being offline (when not logged in), being online and present at the desk (when there is keyboard or mouse activity), or being online but away from the desk (when there is no keyboard or mouse activity, although logged in). Hence, in such embodiments, the current state which is set by user input (e.g. to be timecard state 109 of Working), is repeatedly transmitted to other IMs as per act 175 (FIG. 1F), in a manner similar or identical to transmission of presence status. For example, Instant Messenger 101 may transmit the current state via IM server 120 to IMs of employees identified in buddy list 112 (see IM 121, and IM 123 in FIG. 1D), and also to a timecard module 131 as per act 176 (FIG. 1F).

Hence, in response to the current state being set by user input (e.g. to be timecard state 109 of Working), the current state is transmitted, similar or identical to transmission of presence status, by Instant Messenger 101 to an IM server 120 e.g. in a message 111 (also called "presence status message", see FIG. 1D). IM server 120 in turn transmits the current state of the given employee 102, also similar or identical to transmission of presence status, to the IMs of the other employees identified in buddy list 112 (FIG. 1C) for display therein. IM server 120 also transmits the same current state with a time stamp and an identity of the employee 102 in a message 125 (also called "time entry message") as shown in FIG. 1D to a timecard module 131 in workforce management system 130, for use in preparation of a draft time card for employee 102.

In certain embodiments, a time stamp is recorded locally by Instant Messenger 101 in response to user input as noted above, and that recorded timestamp is included in a message which is sent from IM 101 to timecard module 131. In other embodiments, a timestamp is centrally recorded in timecard module 131, in response to receipt of each message indicating occurrence of a payroll event, from various IMs 101, 121 and 123. Recording time stamps centrally has certain advantages, e.g. not requiring synchronization of clocks for the purpose of generating time cards, across various computers (e.g. desk-tops, lap-tops, or smart-phones) in which IMs 101, 121 and 123 may be executing. Recording time stamps locally has its own advantages, e.g. allowing an employee to record time for the purposes of generating time cards when off-line.

IM server 120 of some embodiments transmits the current state of a given employee 102 (which is a selected timecard state) as one part of presence information that is normally transmitted to a first IM 121 (FIG. 1D) of a first employee 122 (e.g. as a part of a first buddy list which includes similar timecard states of other employees). IM server 120 also transmits the given employee 102's current state (i.e. repeats the transmission), as another part of presence information that is normally transmitted to a second IM 123 (FIG. 1D) of a second employee 124 (e.g. as a part of a second buddy list which includes similar timecard states of other employees). To prepare a buddy list which includes multiple timecard states of employees identified in the buddy list, for transmission to a specific IM (such as one of IMs 121 . . . 123 in FIG. 1D), some embodiments of IM server 120 store the timecard state of each employee on receipt in a local database 120P, while awaiting receipt of similar timecard states from other IMs, followed by periodic preparation and transmission of the list (e.g. every 5 seconds).

In addition to transmission to IMs 121 . . . 123 of employees identified in buddy list 112 of IM 101, IM server 120 also transmits timecard state 109 received from IM 101 to workforce management system 130 (FIG. 1D), e.g. in a time entry message 125. On receipt of the time entry message 125, workforce management system 130 uses a specific timestamp (e.g. 9:01 am) identified therein as the time at which a timecard state was set by user input to be the current state of a given employee 102, as the time of occurrence of the payroll event for the given employee 102. Thus, specific times at which a current state is set (or changed) by user input in an Instant Messenger 101 are used by a timecard module 131 in workforce management system 130 (FIG. 1D) to prepare a draft time card which is eventually used in processing payroll.

Any employee 191 (e.g. Trevor Chan) may initiate a chat session based on viewing a timecard state 107 of working received by (in IM 123 of Trevor Chan, see FIG. 1D) from IM 101, e.g. by double clicking on a name of employee 102 (e.g. Jane Doe) in a buddy list (in IM 123 of Trevor Chan). On doing so, a chat window 192 is opened by Instant Messenger 101, which then receives a response from employee 102 in the normal manner, if employee 102 is at their desk.

However, use of timecard states to determine IM presence in some embodiments does not indicate actual presence of employee 102 at computer 100 (FIG. 1A). In the example described in the immediately preceding paragraph, employee 102 may have gone to bathroom, without changing the current state in Instant Messenger 101. Thus, when employee 191 (e.g. Trevor Chan) initiates the chat session based on viewing a timecard state 107 of working, no response may be received by IM 123, until employee 102 (e.g. Jane Doe) returns to their desk, although the current state in Instant Messenger 101 indicates employee 102 is working. To summarize, employee 102 responds in chat window 192 whenever employee 102 returns to their desk, and not necessarily within a time period expected by employee 191 (e.g. within 5-10 seconds).

In illustrative embodiments, a set of timecard states 107-109 which are displayed in list 110 (FIG. 1B) are determined from a timecard module 131 (FIG. 1D) which is commonly accessed by IMs of all employees in an organization. Thus, the same set of timecard states 107-109 are used by all IMs 101 . . . 121 . . . 123 (FIG. 1D) in tracking employee time, which is to be processed by a payroll system, in generating pay checks. Each employee 102 . . . 122 . . . 124 (FIG. 1D) selects a specific timecard state to be the current state, from among the set of timecard states 107-109 in list 110, to indicate that employee is now entering the selected state (and ending a previously-selected state).

A specific time, at which the current state is set to a timecard state of working or changed from the timecard state of working by user input in Instant Messenger 101, is used automatically as a time of occurrence of an event in payroll processing. The just-described event can be, for example, a clock-in event or as a clock-out event in tracking of time for which payment is to be made to the given employee 102. Hence, certain types of time periods (e.g. working, not working) that are acceptable to a payroll system as input, are used in many embodiments of the invention, as timecard states 107-109, which are made available for selection by user input, e.g. in list 110 of Instant Messenger 101 (FIG. 1B).

In list 110 (FIG. 1B), each one of timecard states 107, 108 and 109 is shown in a separate row, and also shown in each row is one of icons 107I, 108I and 109I corresponding thereto, e.g. in a left column of list 110. List 110 includes a header bar 110H which in an illustrative embodiment is labeled "Presence Status" as shown in FIG. 1B, although other labels may be used in other embodiments. In some embodiments, one of the timecard states 107, 108 and 109 that is displayed in list 110 is selected by user input. For example, the user input may be provided by a given employee 102 (FIG. 1B) using a mouse 103 to move cursor 104 into a position overlapping a row on list 110.

In response to the just-described user input (via list 110), Instant Messenger 101 sets the selected state to an internal variable (e.g. in a memory of computer 100) which is indicative of the current state of the given employee 102. For example, a given employee 102 (named Jane Doe in the example of FIG. 1B) clicks on mouse 103 to select their current state to be timecard state 109 of taking a break, which is thereafter displayed in a row that is used to identify the current state, at the bottom of a buddy list 112 (FIG. 1A) in Instant Messenger 101 (into which given employee 102 has logged in).

By using an Instant Messenger 101 of the type illustrated in FIGS. 1A and 1B and as described herein, a given employee 102 does not need to log into a timecard module or workforce management system (in situations where these are centralized applications executing in a server, and therefore separate from an Instant Messenger executing in a client), in order for a timecard to be generated. Instead, employee 102 (FIG. 1A) only needs to log into their own Instant Messenger 101, and it is Instant Messenger 101 that generates data (e.g. time entries) to be input to a timecard module 131 for preparation of a timecard, as discussed below. By providing user input via mouse 103 (FIG. 1A) to Instant Messenger 101 to set a current state therein to be one of the timecard states, employee 102 saves time and effort, because he/she does not need to personally log into a time card module 131 each time a time card entry (also called "time entry") needs to be recorded.

Data to be input to a timecard module 131 (FIG. 1D) is generated automatically in most embodiments as discussed below, based on changes in a current state that is maintained for a given employee 102 in Instant Messenger 101 (FIG. 1B), which changes represent events of significance for the given employees' time card (also called "payroll events"). A payroll event can be a clock-in event that occurs in tracking of time to be paid to an employee, e.g. when the current state of the given employee is set by user input in an instant messenger to the timecard state 109 of working. Alternatively, the payroll event can be a clock-out event that also occurs in tracking of time to be paid, e.g. when the current state of the given employee is set by user input to any timecard state that is not working, such as the timecard state 108 of going to lunch or the timecard state 107 of taking a break.

A specific time at which a payroll event occurs, e.g. when the current state of a given employee 102 is set by user input in IM 101 to a timecard state, is automatically recorded, depending on the embodiment, by any of the following: (a) IM 101 when the current state is set, (b) IM server 120 when a presence status message 111 (described below) is received therein or (c) timecard module 131 (FIG. 1D) when a time entry message 125 (also described below) is received therein. In embodiments wherein the specific time is recorded by IM server 120, the timestamp identifying the specific time is included in time entry message 125 (FIG.

1D). Regardless of which computer records the specific time, a timecard module 131 of some embodiments receives data identifying the specific time and a current state of the employee 102, e.g. in a message 132 that is similar or identical to a clock-in message or a clock-out message received when the employee 102 clocks-in or clocks-out, e.g. using a stopwatch or timer of a timecard module.

During a day of work at an organization, the current state of a given employee 102 is typically set in Instant Messenger 101 multiple times successively, e.g. based on user input received from the given employee 102 via control 106. Each time that the current state in Instant Messenger 101 is set (each time based on user input which identifies a specific timecard state), the time and the current state is automatically recorded in a memory of computer 100, along with a timestamp of when the current state is set. In such embodiments, the recorded time in the memory of computer 100 is used to generate data, in the form of a sequence of time entries (also called "feed"), for input to timecard module 131 (FIG. 1D), as described below.

In some embodiments, when employee 102 first logs in to Instant Messenger 101 on any given day, the current state therein is set to "Working" and the time of login is recorded as the "clocked-in" time, for use in a timecard to be prepared by timecard module 131. Subsequently, when employee 102 manually changes the current state by user input to Instant Messenger 101 to "At lunch", this change in state and the time when this change occurs is used to populate a timecard with an entry of "Lunch-out". Later, when employee 102 returns, and updates the current state to "Working" that change of timecard state, coupled with the time the timecard state changes, is used as an indication in the timecard that employee 102 is "Lunch-in" (i.e. return to work, back from lunch).

Whenever employee 102 changes their current state in Instant Messenger 101 to "Taking a break" the break is recorded for use in the timecard, in the same way that the Lunch break is recorded, as noted above. Finally, when employee 102 logs out of Instant Messenger 101 (or alternatively updates the current state to "Gone Home" assuming such a timecard state is available in list 110), this change in timecard state coupled with the time of change is recorded for use in the timecard, to indicate that employee 102 has "Clocked-out" at the end of the day. Such changes in current state of employee 102 (and optionally the times when they occur) are supplied to a timecard module 131 (FIG. 1D), asynchronously on occurrence, or periodically e.g. once a day.

One illustrative sequence of time entries that are generated is shown in Table A below, with examples of events that happen in Instant Messenger 101 being shown in the left column, and corresponding examples of time entries provided to timecard module 131 being shown in the right column. As shown by a sequence of cells from top to bottom in the right column of Table A below, a sequence of time entries is generated for a day of work by a given employee 102 (e.g. Jane Doe), based on changes in the current state in Instant Messenger 101. Each time entry includes the following three items: (a) user name, (b) event (e.g. clock-in, clock-out), and (c) timestamp, as shown by each cell in the right column of Table A.

TABLE A

| Instant Messenger | Feed generated to Timecard Module |
|---|---|
| Jane Doe logs into an Instant Messenger at her work desk at 9:01 am on Monday 21$^{st}$ September 2012. The current state of Jane Doe is automatically set to "Working" by the Instant Messenger | "JaneDoe@Oracle.com" "Clock-in" "21-Sep-2012 09:01:00" |
| Employee Jane Doe manually sets her current state to "Taking a Break" at 10:30 am in the Instant Messenger | "JaneDoe@Oracle.com" "Clock-out (Break)" "21-Sep-2012 10:30:00" |
| Employee Jane Doe returns from the break at 10:45 am, and manually sets her current state to "Working" in the Instant Messenger | "JaneDoe@Oracle.com" "Clock-in (Break)" "21-Sep-2012 10:45:00" |
| Employee Jane Doe manually sets her current state to "At lunch" at 11:59 am | "JaneDoe@Oracle.com" "Clock-out (Lunch)" "21-Sep-2012 11:59:00" |
| Employee Jane Doe returns from lunch at 1:00 pm and manually sets her current state to "Working" | "JaneDoe@Oracle.com" "Clock-in (Lunch)" "21-Sep-2012 13:00:00" |
| Employee Jane Doe manually sets her current state to "Taking a Break" at 3:30 pm | "JaneDoe@Oracle.com" "Clock-out (Break)" "21-Sep-2012 15:30:00" |
| Employee Jane Doe returns from break at 3:45 pm and manually sets her current state to "Working" | "JaneDoe@Oracle.com" "Clock-in (Break)" "21-Sep-2012 15:45:00" |
| Employee Jane Doe logs out from Instant Messenger at 5:00 pm and leaves for home | "JaneDoe@Oracle.com" "Clock-out" "21-Sep-2012 17:00:00" |

In many embodiments, a sequence of time entries shown in the right column of Table A (above) are transmitted by Instant Messenger 101 to timecard module 131 in a workforce management system 130 (FIG. 1D), e.g. transmitted in a manner similar or identical to transmission of presence states that indicate user availability for a chat session. In alternative embodiments, a sequence of time entries of the type shown above are collected together in a computer memory over a predetermined time period (e.g. during a day, or during a week, or during a month). The just-described collection of time entries can be prepared e.g. by Instant Messenger 101 in computer 100, or by an intermediate computer such as an IM server 120 (FIG. 1D), followed by transmission of a prepared sequence in its entirety (e.g. in a single message) to timecard module 131 (FIG. 1D).

In some embodiments, a timecard module 131 creates a draft timecard (e.g. as per act 181 in FIG. 1F) in a workforce management system 130 (FIG. 1D), although in alternative embodiments the timecard module is implemented in computer 100. In the alternative embodiments, the above-described time entries are not transmitted by Instant Messenger 101 and instead they are stored in a memory of computer 100 (such as a non-volatile memory) that is accessible to timecard module 131 which is locally executing in computer 100 as illustrated in FIG. 5B. Regardless of which computer implements timecard module 131, it receives the sequence of time entries of a given employee 102.

Figure 1C:
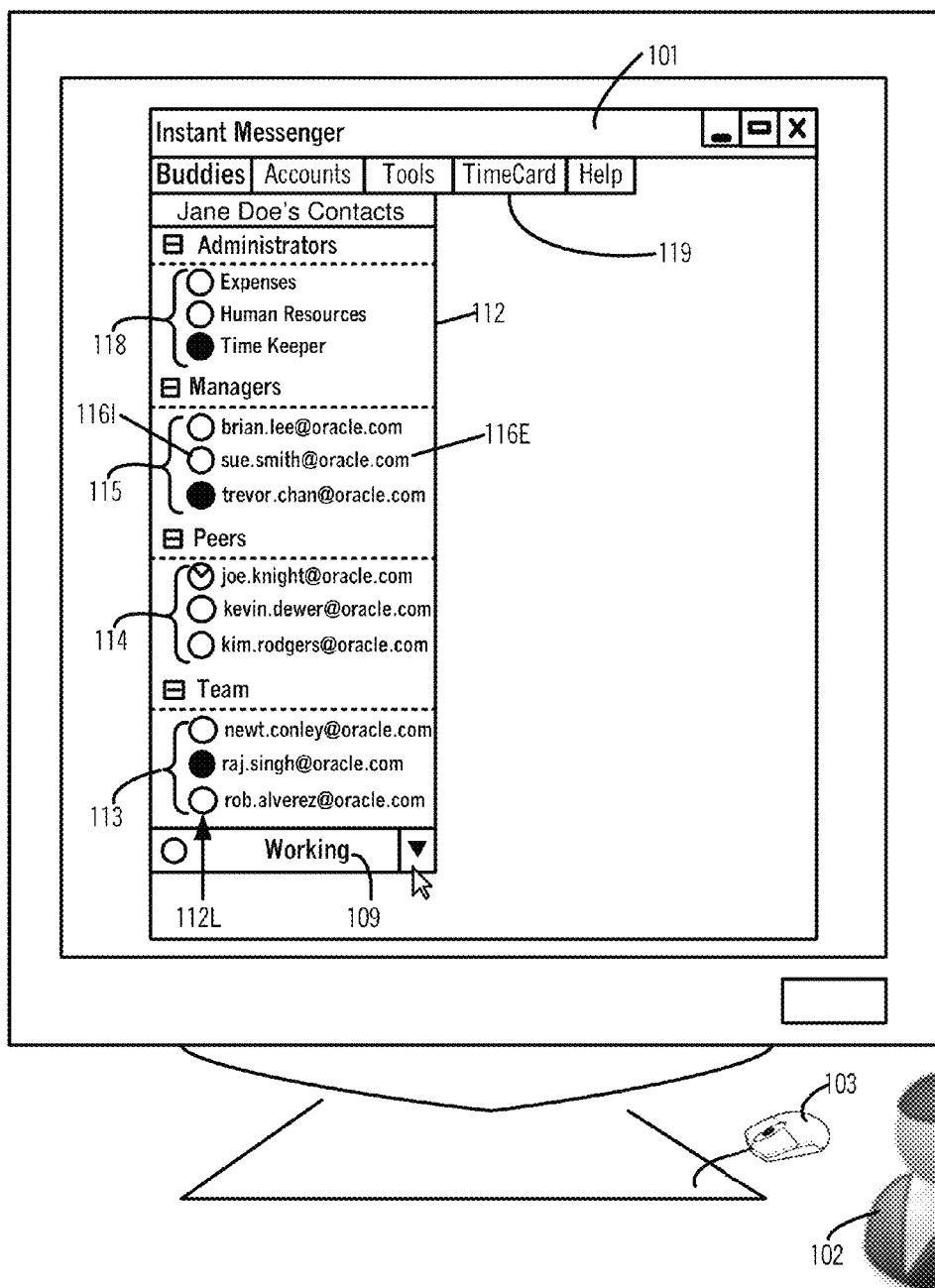
Figure 1D:
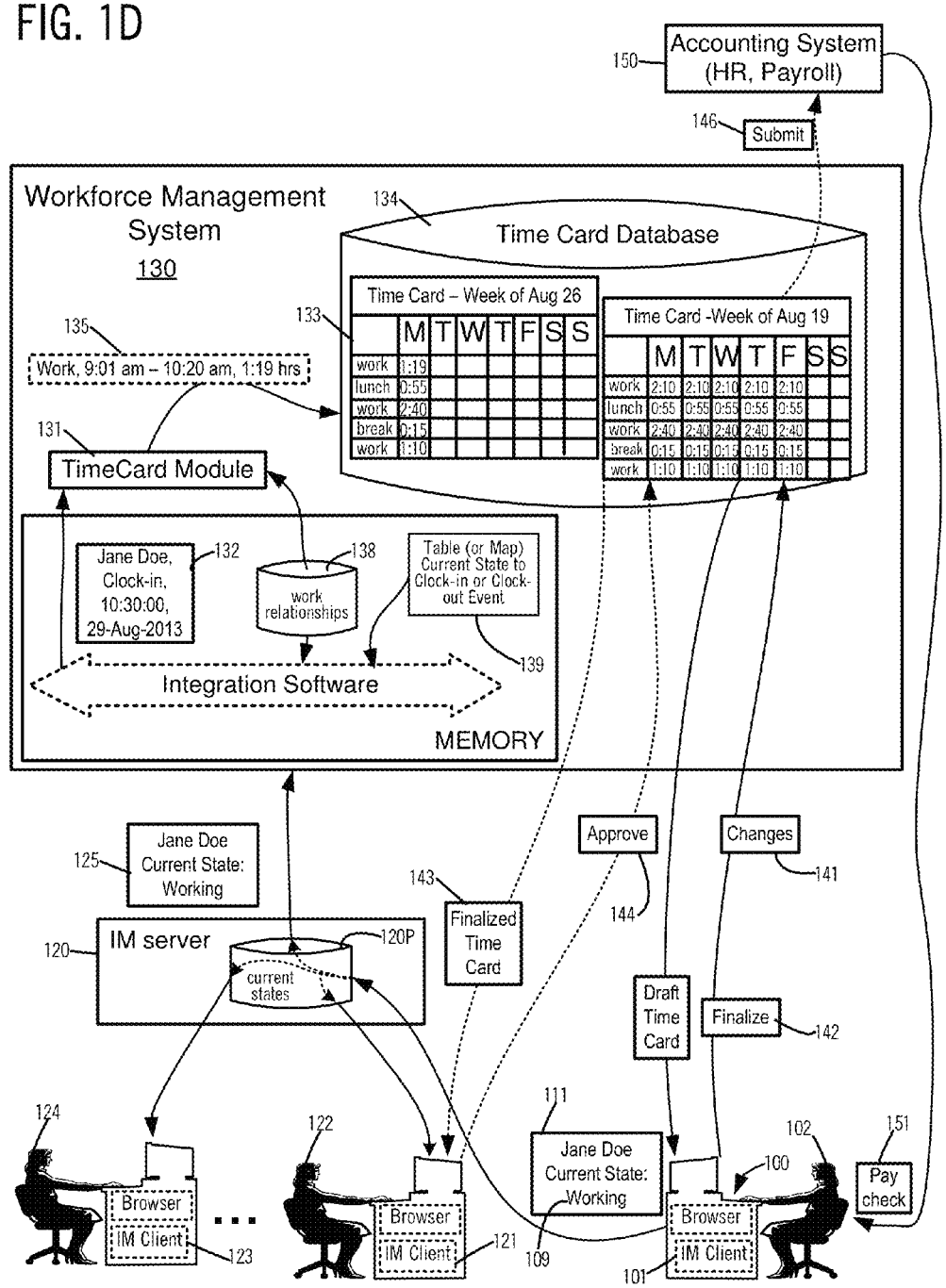
FIG. 1D illustrates, in a block diagram, data exchanged by Instant Messenger 101 (described above), an instant messaging server 120 and a timecard module 131 in several embodiments of the invention.

As noted above, in addition to sharing the current state of a given employee 102 (e.g. Jane Doe) with a timecard module 131 that executes locally or remotely, Instant Messenger 101 additionally shares this same timecard state with other instant messengers (IMs) of other employees who are identified as buddies of the given employee 102 in a buddy list 112 (FIG. 1C). Specifically, buddy list 112 in Instant Messenger 101 displays email addresses and current states of buddies in the organization (employees that have a work relationship with the given employee 102).

Some embodiments use a database 138 in workforce management system 130 (FIG. 1D) to identify work relationships of the given employee 102. Specifically, database 138 of work relationships identifies a hierarchy of employees in the organization, e.g. identifies the supervisory employees and the subordinate employees (if any) of every employee. In several such embodiments, Instant Messenger 101 uses database 138 to allow employee 102 to add to list 112 (FIG. 1C) as buddies, a team of employees 113 that report (direct or cross-function) to given employee 102. Prior to adding to list 112, Instant Messenger 101 confirms that every employee 113 in the team (FIG. 1C) has their work relationship being identified in database 138 as reporting directly to (and hence subordinate employees relative to) the given employee 102 who is logged into the Instant Messenger 101.

Similarly, Instant Messenger 101 uses database 138 to allow adding to list 112 (FIG. 1C) several employees 115 who are managers (direct or cross-function) of given employee 102. Specifically, Instant Messenger 101 confirms by use of database 138 that a work relationship identifies each of employees 115 as someone to whom directly reports (and hence who are supervisory employees relative to) given employee 102. Also shown in buddy list 112 (FIG. 1C) are employees 114 who are added as buddies after Instant Messenger 101 uses database 138 to confirm them as peers of given employee 102. Employees 113, 114 and 115 may be added to buddy list 112 of Instant Messenger 101 based on user input from employee 102 received as mouse clicks on a display (not shown) of a hierarchy of work relationships retrieved from database 138.

In some embodiments, buddy list 112 (FIG. 1C) of every employee includes certain buddies by default, such as buddies 118 who are administrators in the organization that can provide help and other assistance to the employee, e.g. Administrator for Expenses, Administrator for Human Resources and Administrator for Time Keeping. In several such embodiments, each administrator in buddy list 112 of employee 102 is identified by use of work relationships in database 138 (as to which specific administrator in the organization is assigned to assist which specific employee).

An employee may be identified in a row in list 112 (FIG. 1C), by their email address 116E, and in many embodiments this same row also includes an icon 116I that is indicative of the employee's current state (similar or identical to presence status). For example, among employees 113 who report to given employee 102 as shown in FIG. 1C, an employee with email address "raj.singh@oracle.com" is shown with the icon 108I indicating that the current state set by user input in his Instant Messenger (IM) is timecard state 108 of being at lunch and two employees with email addresses "newt.conley@oracle.com" and "rob.alverez@oracle.com" are shown with the icon 109I indicating that the current state set by user input in their IMs is timecard state 109 of working. In addition, the presence states of employees of the organization who are identified in buddy list 112 is shown by icons in a left column 112L (FIG. 1C) thereof, in Instant Messenger 101. Similarly, the IMs of such other employees show, in an icon, the current state of a given employee 102 (selected to be one of the timecard states).

In many embodiments, the icons of states displayed in column 112L are not limited to the timecard states 107-109 which are displayed for selection in list 110 (FIG. 1B). Specifically, some such embodiments of Instant Messenger 101 support the display of additional timecard states which may be of type working or non-working. An example of an additional working timecard state is being in a meeting. In several embodiments, a current state in IM 101 is set to this timecard state by user input via list 110 in the above-described manner. Alternatively, the current state in IM 101 may be set to the working timecard state of being in a meeting, automatically based on information in a calendar of the given employee 102, stored in a database (such as database 134).

Figure 1E:
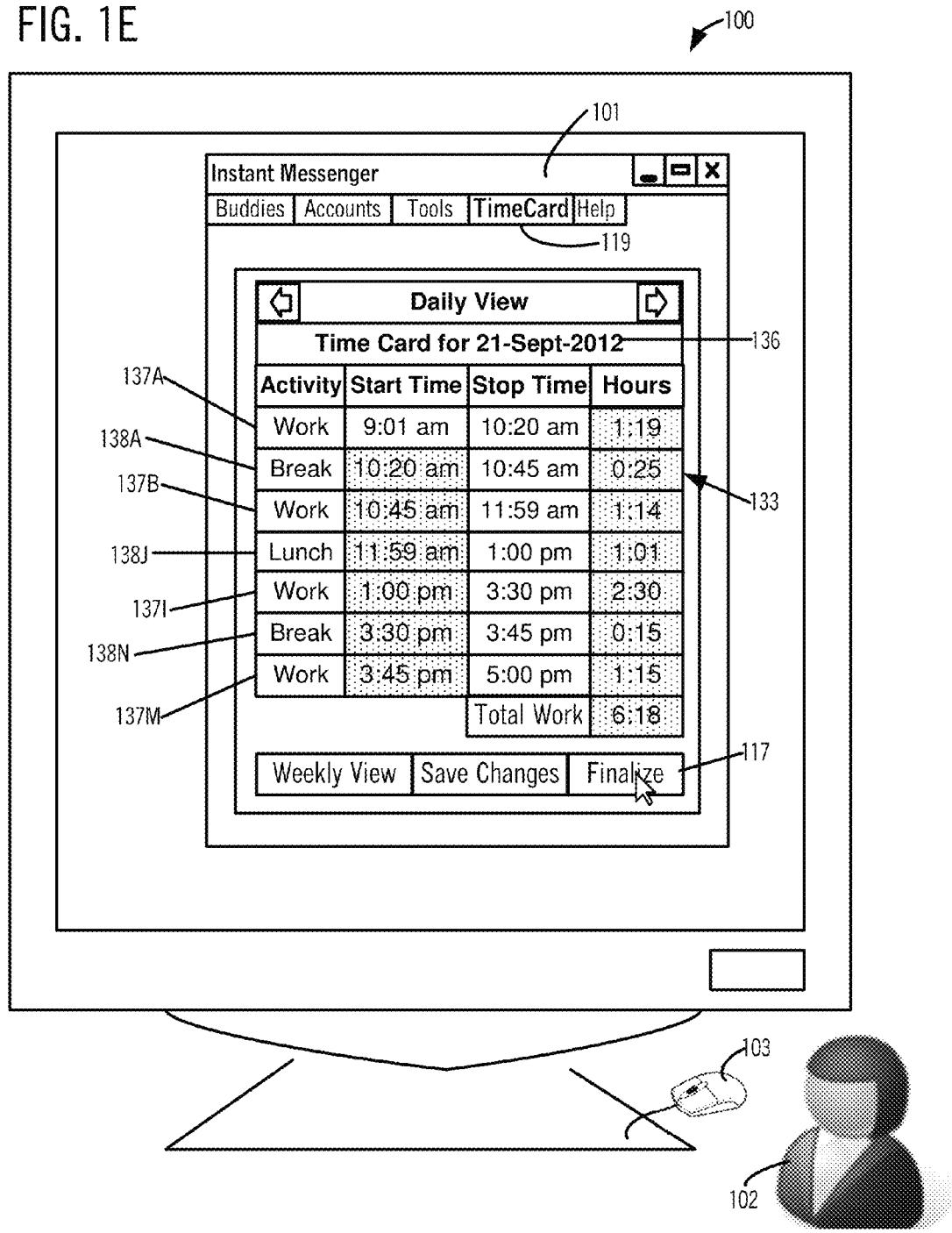
Figure 1F:
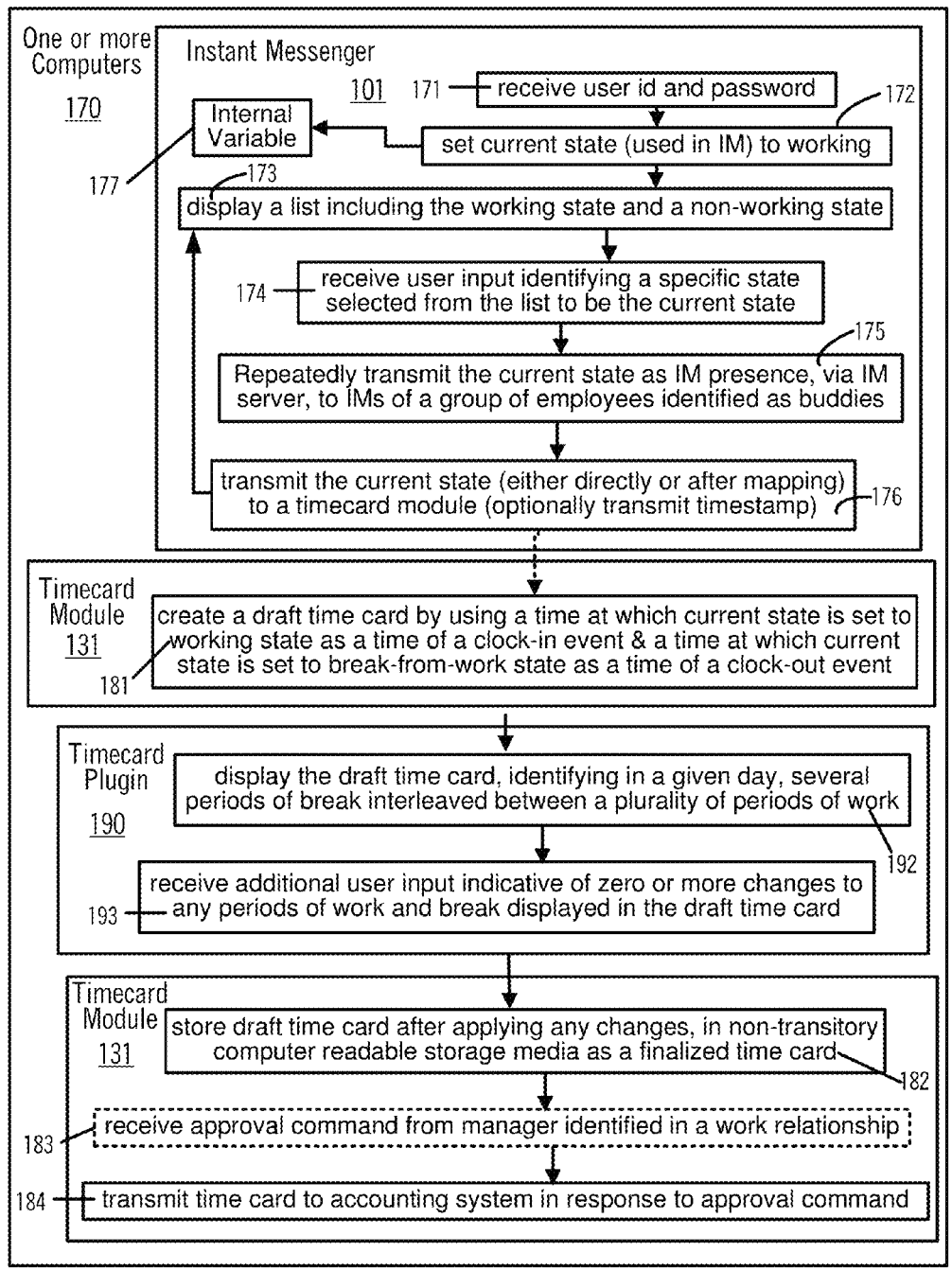
FIG. 1F illustrates, in a flow chart, acts performed by one or more of Instant Messenger 101, instant messaging server 120 and timecard module 131 in some embodiments.
Figure 1G:
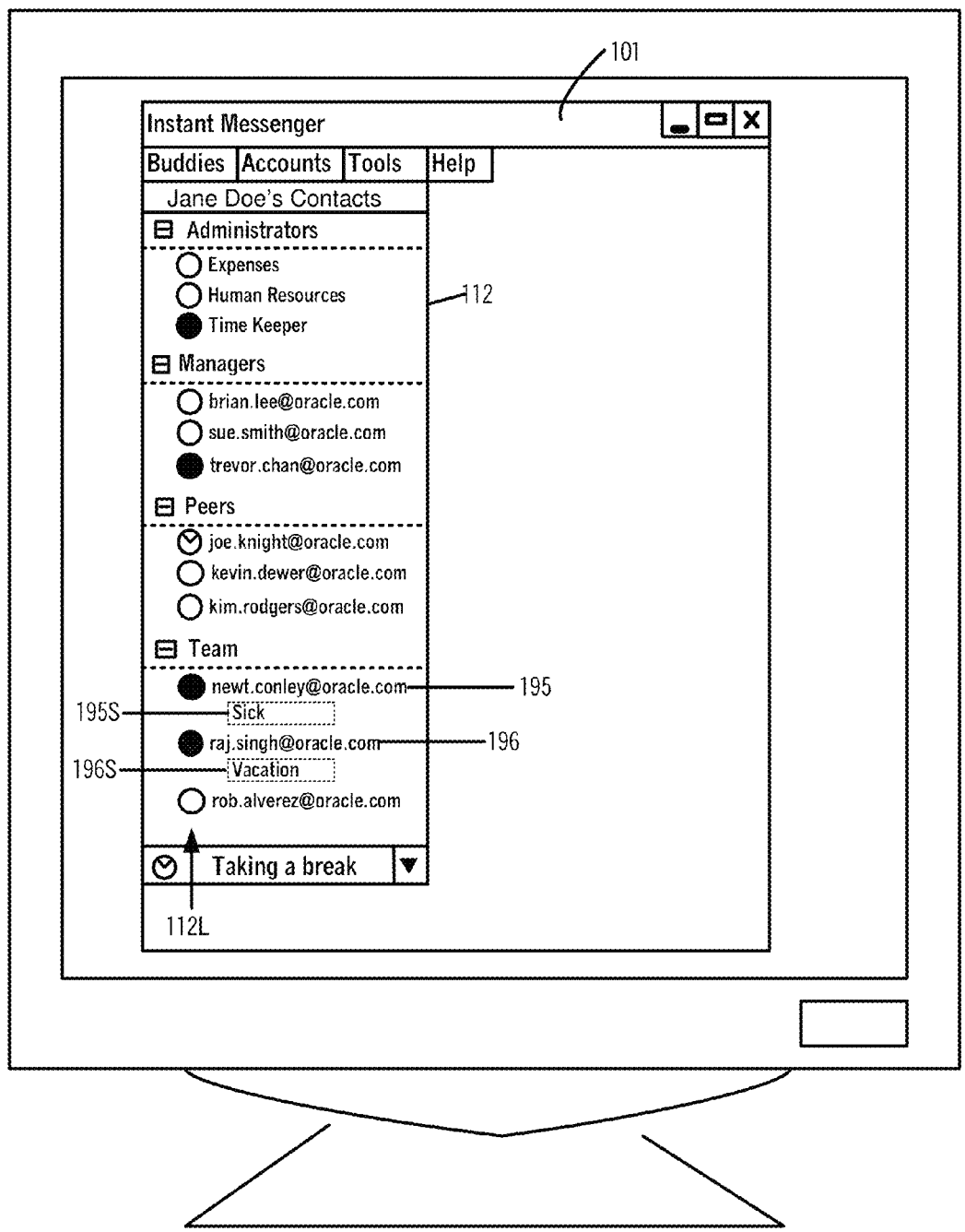

Three examples of non-working timecard states are being sick, being on paid-time-off, and being on vacation. A current state in IM 101 may be set to one of these just-described three examples of non-working timecard states either based on user input via list 110, or automatically based on information in the calendar of the given employee 102 as noted above. For example, FIG. 1G illustrates a buddy list 112 in which is displayed the current state of employee 195 as the non-working timecard state 195S of being sick. Also in FIG. 1G, the current state of employee 196 is identified as the non-working timecard state 196S of being on vacation. In the embodiment shown in FIG. 1G, the two states 195S and 196S are identified in buddy list 112 by words (in addition to the icons in left column 112L, although states 195S and 196S can be displayed with additional icons in other embodiments.

Employees in buddy list 112 (FIG. 1C) can be any group of employees in an organization who have been added to list 112 in a normal manner. Specifically, other employees may be added to list 112 automatically, based on a database 138 of work relationships in the organization, or manually based on user input from employee 102, depending on the embodiment. Manual addition of employees by employee 102 to buddy list 112 may be limited in some embodiments, e.g. only those employees with whom employee 102 has a work relationship as identified by database 138 may be accepted, via the user input to add other employees to buddy list 112 of employee 102.

In some embodiments, a timecard module 131 (FIG. 1D) in workforce management system 130 receives time entries 132 (either individually, or as a collection) and uses them to automatically prepare a draft time card 133 (FIG. 1D) for the given employee 102 (who is named in the time entries 132). In an illustrative example, timecard module 131 uses a time (also called "first time") in a time entry (e.g. 9:01 am identified in a first time entry, shown in the first cell in the right column of Table A) at which the current state is set by user input in Instant Messenger 101 to a timecard state (also called "first timecard state") as a time of occurrence of a clock-in event, identifying the time at which the given employee 102 started working.

Continuing with the example in Table A above, timecard module 131 uses another time (also called "second time") in another time entry (e.g. 10:30 am identified in a second time entry, shown in a second cell in the right column of Table A) at which the current state is set by user input in Instant Messenger 101 to a non-working timecard state (also called "second timecard state") as a time of occurrence of a clock-out event, identifying the time at which the given employee 102 stopped working.

Timecard module 131 uses the time when the employee started working and the time at which the employee stopped working to form a record 135, which may optionally include the duration there-between (obtained by subtracting the time of starting work from the time of ending work). Timecard module 131 appends record 135 to a set of records that together constitute a time card 133 of the given employee 102, for a given time period (such as a day, a week, or a month). Timecard module 131 stores a draft time card 133 in a database 134 (also called "timecard database"), from which the draft time card 133 may be retrieved and displayed to the given employee 102 as per act 192 in FIG. 1F.

Thus, a draft time card 133 is prepared automatically by timecard module 131, without a given employee 102 expressly logging into timecard module 131, and without the given employee 102 expressly preparing any time entries in timecard module 131. Instead, automatic preparation of draft time card 133 by timecard module 131, based on user input by the given employee 102 to set the current state in Instant Messenger 101, eliminates the need for manual timekeeping, which is normally tedious for the given employee 102. Moreover, selection of the current state by user input in Instant Messenger 101 eliminates errors that may arise in automatically capturing time entries.

In addition, because time card 133 prepared by timecard module 131 is in draft form, it is available for review by the given employee 102. Specifically, in some embodiments, a user interface in computer 100 includes a button 119 (FIG. 1C) that is operable by the given employee 102 to cause the draft time card 133 to be retrieved from database 134, although in other embodiments, such a timecard retrieval function can be implemented in a different application. Although in some embodiments, button 119 (FIG. 1C) is labeled with the word "TimeCard", other words may be used in user interfaces of other embodiments (e.g. "TimeSheet").

In response to operation of button 119 (or other such user input), computer 100 displays (as per act 192 in FIG. 1F) draft time card 133 on a video monitor e.g. in a user interface (see FIG. 1E) of an Instant Messenger 101 (into which the given employee 102 has already logged in). As illustrated in FIG. 1E, the draft time card 133 identifies a given day 136, and several periods of break 138A . . . 138J . . . 138N (A≤J≤N, N being the number of break periods) interleaved between a plurality of periods of work 137A . . . 137I . . . 137M (A≤I≤M, M being the number of work periods). In time card 133, each period of break is identified as being in a non-working timecard state, such as period 138J being identified to be the timecard state 108 of being at lunch. Moreover, in time card 133, each period of work is identified as being in the working timecard state, such as period 138I being identified to be the timecard state 107 of working.

Although some embodiments require a button 119 (FIG. 1C) to be operated by user input, to cause a draft time card to be retrieved and displayed, other embodiments of Instant Messenger 101 operate automatically to display the draft time card (see FIG. 1E, described above), e.g. in response to an event that normally occurs in an Instant Messenger, and is selected to trigger the display, e.g. a command (via user input) to logout of Instant Messenger 101. The selected event is set up, in certain embodiments, to equate: (1) a periodicity of occurrence thereof and (2) a period of the timecard. For example, a time card for a day is displayed, when the selected event occurs once a day, whereas a timecard for a week is displayed when the selected event occurs once a week. In several such embodiments, the periodicity of the just-described selected event is configurable via user input, as follows. Some employees configure their IMs to display a time card for each week in response to logging off from their IM on the last day of the week, whereas other employees may configure their IMs to display a time card for an entire month in response to logging off from their IM on the last day of the month.

After viewing draft time card 133 (FIG. 1E), a given employee 102 may provide additional user input to Instant Messenger 101 to make changes and/or to finalize. Hence, as per act 193 (FIG. 1F) Instant Messenger 101 receives additional user input indicative of zero or more changes 141 (FIG. 1D) to any periods of work and break displayed in draft time card 133 (FIG. 1E). For example, employee 102 may optionally provide user input to computer 100 via a keyboard to change a start time of the day in the time card, or to similarly change a stop time of any period. After making any changes (or if no changes are needed), employee 102 may issue a finalize command 142 (FIG. 1D), e.g. by clicking on a button 117 (FIG. 1E) displayed by Instant Messenger 101 on a video monitor of computer 100.

In response to receiving such additional input, any changes that are optionally identified are applied to the draft time card (e.g. by timecard module 131) followed by storing (as per act 182 in FIG. 1F) the changed time card as a finalized time card. Specifically, the changed time card may be marked in database 134 (FIG. 1D) as being final, e.g. in a column of a table of time cards in database 134. In some embodiments database 134 is a relational database, and a table of time cards therein includes columns that store indexes and/or keys (such as a primary key and a foreign key which is the primary key of another table, such as an employee table).

After act 182, in some embodiments, an act 184 (FIG. 1F) wherein the finalized time card is automatically transmitted to an accounting system 150 (or marked in an additional field of the above-described database table, as being ready for transmission at a scheduled time in future). Certain embodiments do not require supervisor approval prior to act 184, and these embodiments rely on an honor system in which each employee certifies that their timecard is true and accurate. However, other embodiments require supervisor approval wherein each finalized timecard is made accessible (e.g. by timecard module 131) to another employee, such as employee 122 who has a predetermined work relationship with the given employee 102 (e.g. employee 122 is identified by use of database 138 of work relationships, to be a manager of employee 102). Employee 122 reviews the finalized time card 143 (FIG. 1D) of a given employee 102 and if there are no changes needed to the finalized time card 143, employee 122 provides an approve command 144 via user input.

Accordingly, as per an act 183 in FIG. 1F (which is performed in some embodiments although skipped in other embodiments), timecard module 131 receives the approval command from the manager (as noted above, identified in a work relationship as the manager to whom the given employee reports). In embodiments that require supervisory approval, it is in response to the approval command that act 184 in FIG. 1F is performed, whereby timecard module 131 transmits the finalized time card to the accounting system 150 (FIG. 1D).

Instead of immediate transmission to accounting system 150 on receipt of the approval command in some embodiments, the time card is marked in database 134 as being ready for submission to the accounting system (e.g. by timecard module 131). Subsequently, a submit command 146 is generated (e.g. on a periodic schedule, such as monthly, or weekly) to an accounting system 150 to which are then transmitted all approved time cards in database 134 (as per act 184 in FIG. 1F). During payroll processing, accounting system 150 uses each received time card to compute and store in one or more non-transitory computer-readable storage media, a salary to be paid. For example, each period of work that is identified in an approved time card 145 is multiplied by a predetermined hourly rate of the given employee 102, to obtain a period-specific amount of money which is then summed up with similar period-specific amounts for other periods in a time card to obtain a gross amount to be paid to employee 102.

The gross amount computed by accounting system 150 based on a received time card is automatically reduced by one or more of: (a) deductions (e.g. for healthcare etc), (b) Federal taxes, and (c) State taxes (if any), to obtain net pay for the given employee 102. Then, accounting system 150 provides payment of the remainder as net pay to employee 102, e.g. by printing and mailing a paper check 151 to employee 102 or by sending an instruction to a computer of a financial organization (such as a bank) to perform electronic funds transfer into a bank account of employee 102.

Although in some embodiments, a timecard state which is selected in list 110 as the current state is itself transmitted with no change thereon as presence information to other IMs, in alternative embodiments the timecard state is not directly used as presence information and instead the timecard state is indirectly used, e.g. by mapping into a presence status or vice versa. To support indirect use, alternative embodiments of a workforce management system 130 (FIG. 1D) may include a table 139 (also called map) in memory that is to be looked up to convert presence status to timecard state or vice versa. Such a table 139 can be looked up by IM server 120 (FIG. 1D) using any timecard state (which is identified by user input to select a current state in list 110) as input thereto, to obtain as output from the table 139 a presence status, for use in the normal manner by any instant messenger.

Figure 2A:
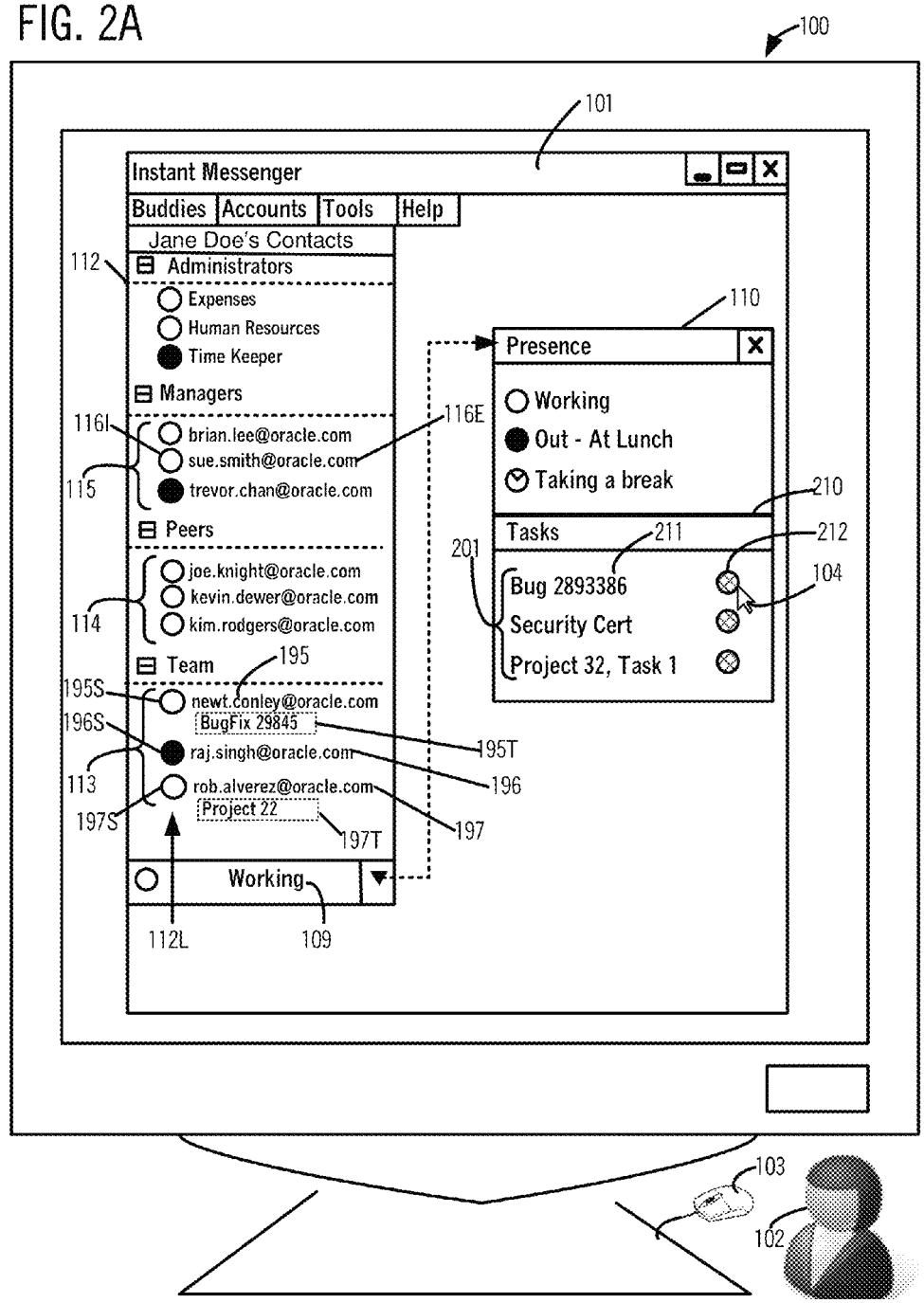

In some embodiments, operation of control 106 displays list 110 (shown in FIG. 1B and described above), and additionally another list 210 (FIG. 2A) which displays a set of tasks 201, in which a current task is selectable by user input to IM 101. In some embodiments, the two lists 110 and 210 are displayed appended to one another as shown in FIG. 2A, although in other embodiments the two lists can be displayed independent of one another. Regardless of how displayed, in addition to making one selection in list 110 by user input to identify a current state, employee 102 may provide further user input to IM 101 (again by operating mouse 103 to move cursor 104 and click a mouse button) to select a specific row in list 210, which row contains an icon 212 indicative of a "to be done" status, and identification of a task 211 (identified by its name "Bug 2893386").

In several embodiments, in response to receipt of the further user input, IM 101 changes the icon 212 by replacing it with another icon 213 (FIG. 2B) which is indicative of a "in progress" status. Subsequently, on completion of task 211, employee 102 may provide additional user input in the row (again by operating mouse 103 to move cursor 104 on to icon 213 in FIG. 2B and click a mouse button), to dismiss task 211. Specifically, when additional user input is received in any row wherein icon 213 (FIG. 2B) indicative of "in progress" status is displayed, the list 210 is re-displayed but without task 211 (e.g. tasks 214 and 215 are displayed in list 210, with one or more new tasks if any).

Figure 2B:
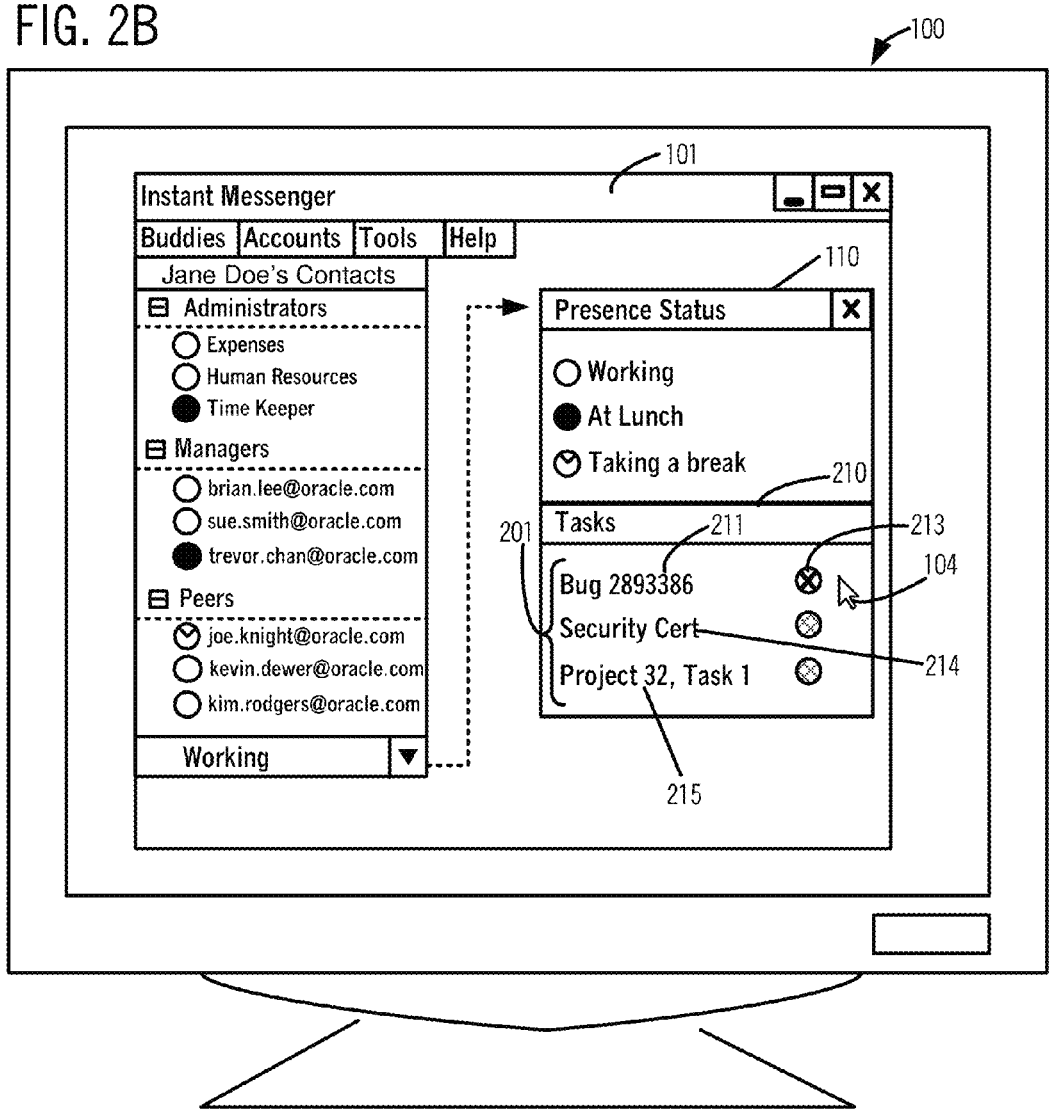
Figure 2C:
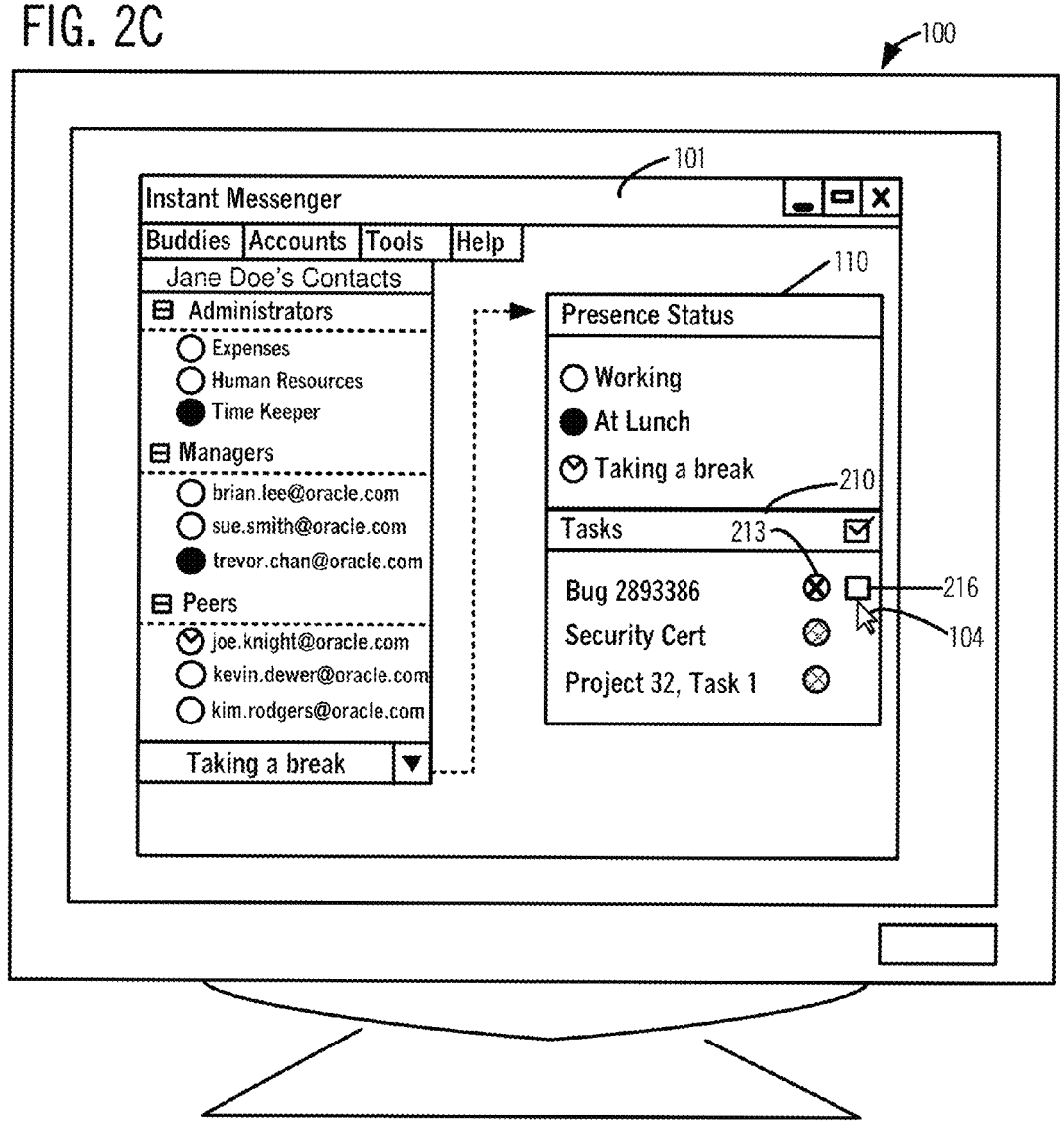
Figure 2D:
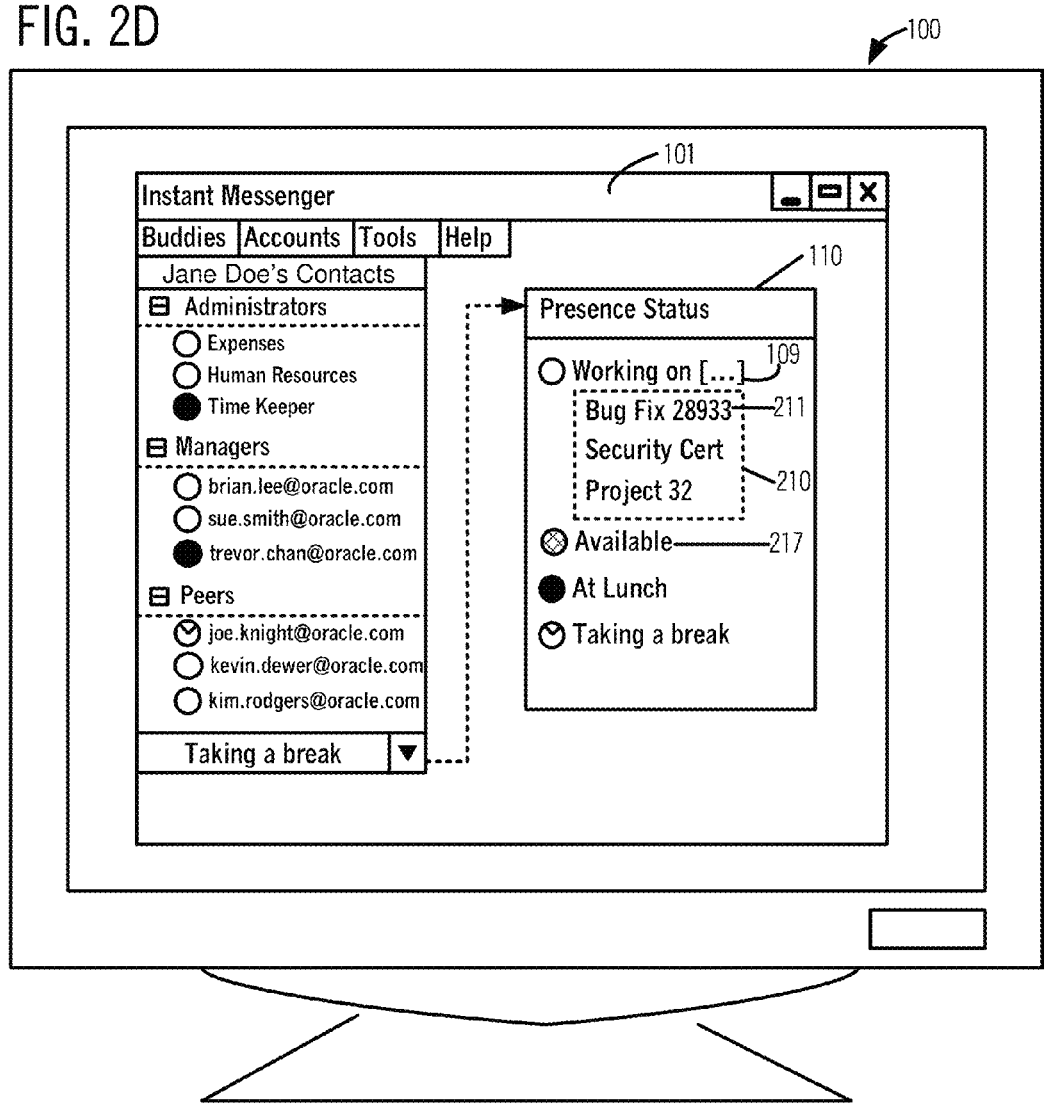
Figure 2E:
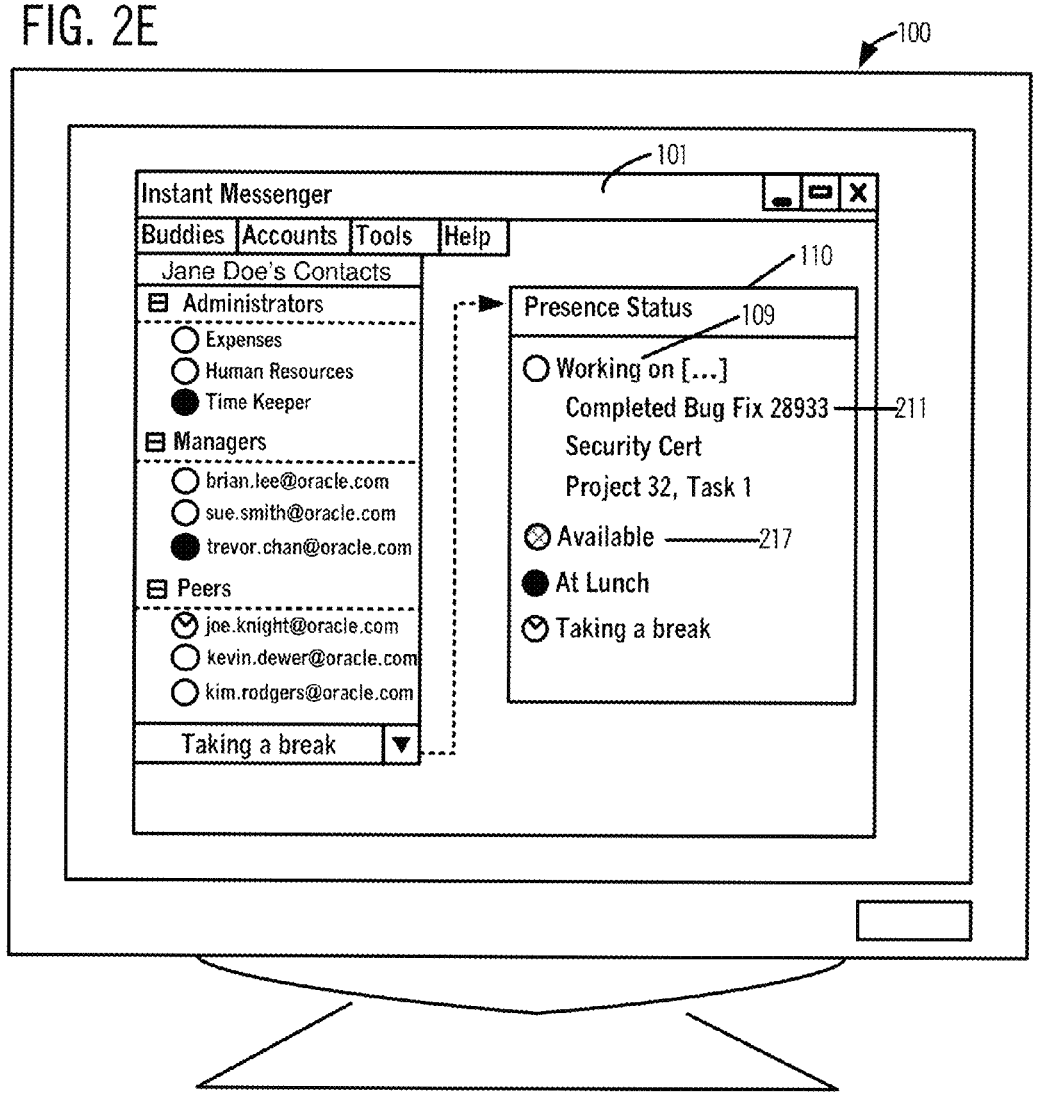

In certain alternative embodiments, instead of clicking on icon 213 to indicate task completion (FIG. 2B), a mouse click is required on a new icon 216 as shown in FIG. 2C. Furthermore in some alternative embodiments, instead of displaying lists 110 and 210 appended to one another, list 210 is displayed embedded within list 110 as shown in FIG. 2D. In embodiments of the type shown in FIG. 2D, list 210 is shown immediately below the timecard state 109 of working. Therefore, in the list 110 shown in FIG. 2D as well, employee 102 may provide user input to select task 211 as described above in reference to FIGS. 2A and 2B. Thereafter, when task 211 has been completed, employee 102 may provide additional user input by clicking on task 211 in list 110 (FIG. 2D), following which the list 110 is re-displayed with the status of task 211 shown therein as "Completed", as illustrated in FIG. 2E.

In several embodiments, in response to receipt of the user input to select a task in list 210 (described above in reference to FIG. 2A), IM 101 shares an identification of the current task selected by employee 102 via IM server 120 (described above in reference to FIG. 1D), with one or more IMs of other employees. The IMs of other employees with whom identification of a current task of employee 102 is shared, depends on the embodiment. In some embodiments, the current task is automatically transmitted to IMs of all employees who are identified in buddy list 112, and every employee on buddy list 112 can see in their buddy lists, a specific task that is currently being worked on by employee 102 and vice versa. However, in some embodiments, the identification of the current task is transmitted selectively, only to IMs of one or more supervisory employees but not transmitted to IMs of one or more subordinate employees and also not transmitted to IMs of one or more peer employees. In one example, IM server 120 uses names of other employees identified in buddy list 112 with work relationships in database 138 (FIG. 1D) to determine whether or not to transmit identification of the current task to the other employees.

Specifically, when an employee in buddy list 112 is determined by use of database 138 (FIG. 1D) to be a manager (or manager of manager) of employee 102, the current task identification is transmitted to that employee's IM. Similarly, when the employee in buddy list 112 is found by use of database 138 (FIG. 1D) to be not a manager of employee 102 (e.g. peer or subordinate thereof) then the test is not met, and the current task identification is not transmitted. Thus, in the example illustrated in FIG. 2A, the identification of the current task of employee 102 is sent only to IMs of managers 115 but not to IMs of employees 114 that are peers and also not to IMs of employees 113 that are direct reports of employee 102. In some embodiments, a determination of which employee in buddy list 112 is entitled to receive a current task identification is made once per IM session (e.g. each time employee 102 logs into IM 101), while other embodiments may perform this test each time that an IM status list is prepared for the other employees on buddy list 112.

In embodiments of the type illustrated in FIGS. 2A and 2B, employee 102 can see in IM 101 the various tasks currently being worked on by certain employees 113 (as they are subordinate employees of employee 102), but cannot see in IM 101 the tasks of other employees. Specifically, as illustrated in FIG. 2A, Instant Messenger 101 displays a current task 195T and a current state 195S of employee 195 in a team of employees 113 who report to employee 102. Similarly, Instant Messenger 101 displays a current task 197T and a current state 197S of employee 197 who is also in the team of employees 113. No task is displayed for employee 196 although in the team of employees 113, because the current state 196S of employee 196 is to Out-at lunch. As illustrated in column 112L on the left side of FIG. 2A, Instant Messenger 101 displays an icon indicative of the current state of each of employees 115 but not the current tasks of any of employees 115, based on the work relationship in database 138 indicating employees 115 as supervisors of employee 102 (e.g. direct or indirect managers of employee 102).

Figure 2F:
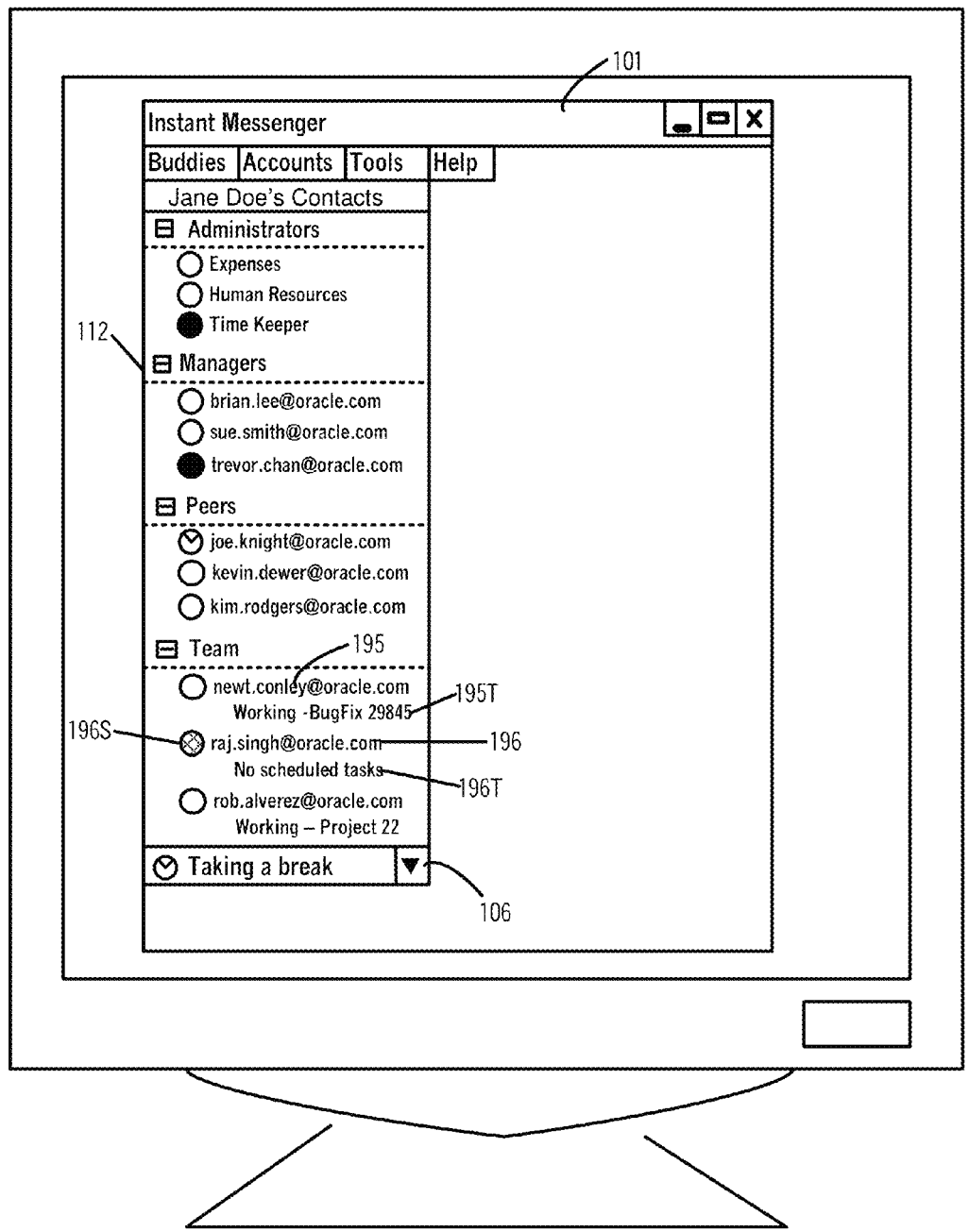

Some embodiments of the type shown in FIG. 2D enable use of two working timecard states, namely: (1) timecard state 109 of working on a task (which is identified as the current task as described above in reference to FIGS. 2A and 2B), and (2) timecard state 217 of being available to work (e.g. when no task is selectable, because the set of tasks 201 of FIGS. 2A and 2B is empty). When employee 102 selects the timecard state 217 of being available to work, via user input to IM 101, the availability of employee 102 is displayed to one or more employees 115 to whom employee 102 reports directly or indirectly (e.g. as per database 138 in FIG. 1D). In a similar manner, in response to employee 196 (FIG. 2F) selecting the timecard state 217 in their own IM, IM 101 of employee 102 displays the current state 196S of employee 196 as being available, and further displays the current task 196T as "No scheduled tasks." IM 101 displays current task 196T based on a determination that employee 196 reports directly or indirectly to employee 102 (e.g. as per database 138 in FIG. 1D).

Figure 2H:
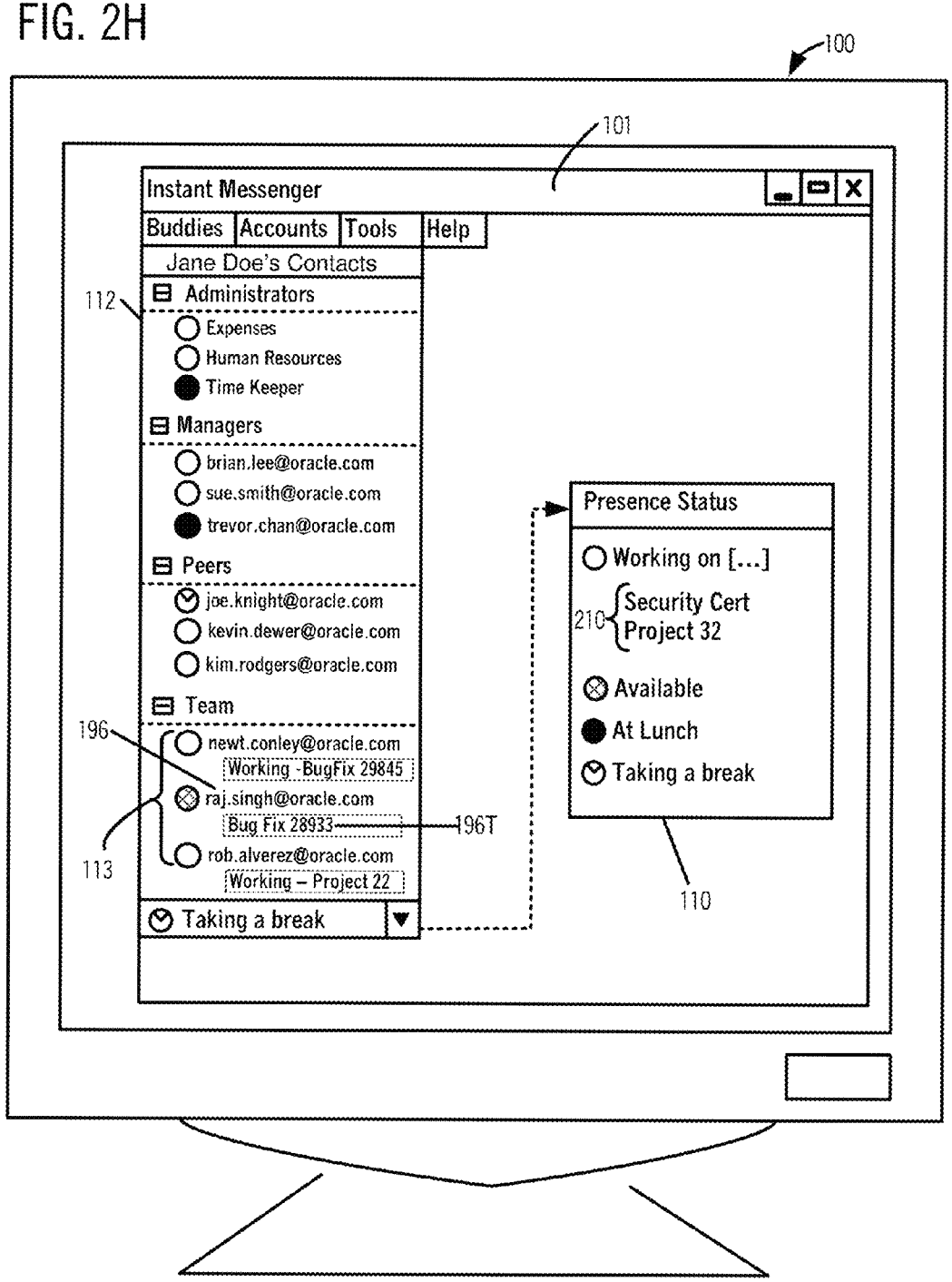

In some embodiments, Instant Messenger 101 of the type described above supports re-assignment of tasks by a manager to employees within the manager's team, as follows. Employee 102 may click on control 106 (FIG. 2F) to display list 210 which is embedded in list 110 (FIG. 2G). Then, employee 102 may select a specific task 231 by placing cursor 104 thereon and clicking a mouse button, and perform a drag-and-drop operation by moving cursor 104 to select any employee 113 that reports to employee 102, such as employee 196 illustrated as selected by cursor 104 in FIG. 2G. The just-described drag-and-drop operation in user input is a task re-assignment command to Instant Messenger 101 of some embodiments, which is implemented by performing the following: (a) task 231 disappears from list 210 of employee 102 (whereby list 210 is re-displayed without task 231), (b) a message to re-assign task 231 to employee 196 is transmitted (identifying task 231 and employee 196) from the Instant Messenger 101 to task management module 340 for storage in a database and supplying to task distribution module 330 and (c) task 231 appears in a corresponding task list of employee 196. After the task re-assignment command is performed, employee 196 may select task 231 to be their current task at which point task 231 appears in buddy list 112 of employee 102 (who is the manager of employee 196), as the current task 196T of employee 196, as illustrated in FIG. 2H. Although task re-assignment is performed in some embodiments in response to receipt of a drag-and-drop operation in Instant Messenger 101, other embodiments are responsive to receipt of other user input (via keyboard or mouse or both) in Instant Messenger 101, as the task re-assignment command.

Figure 3A:
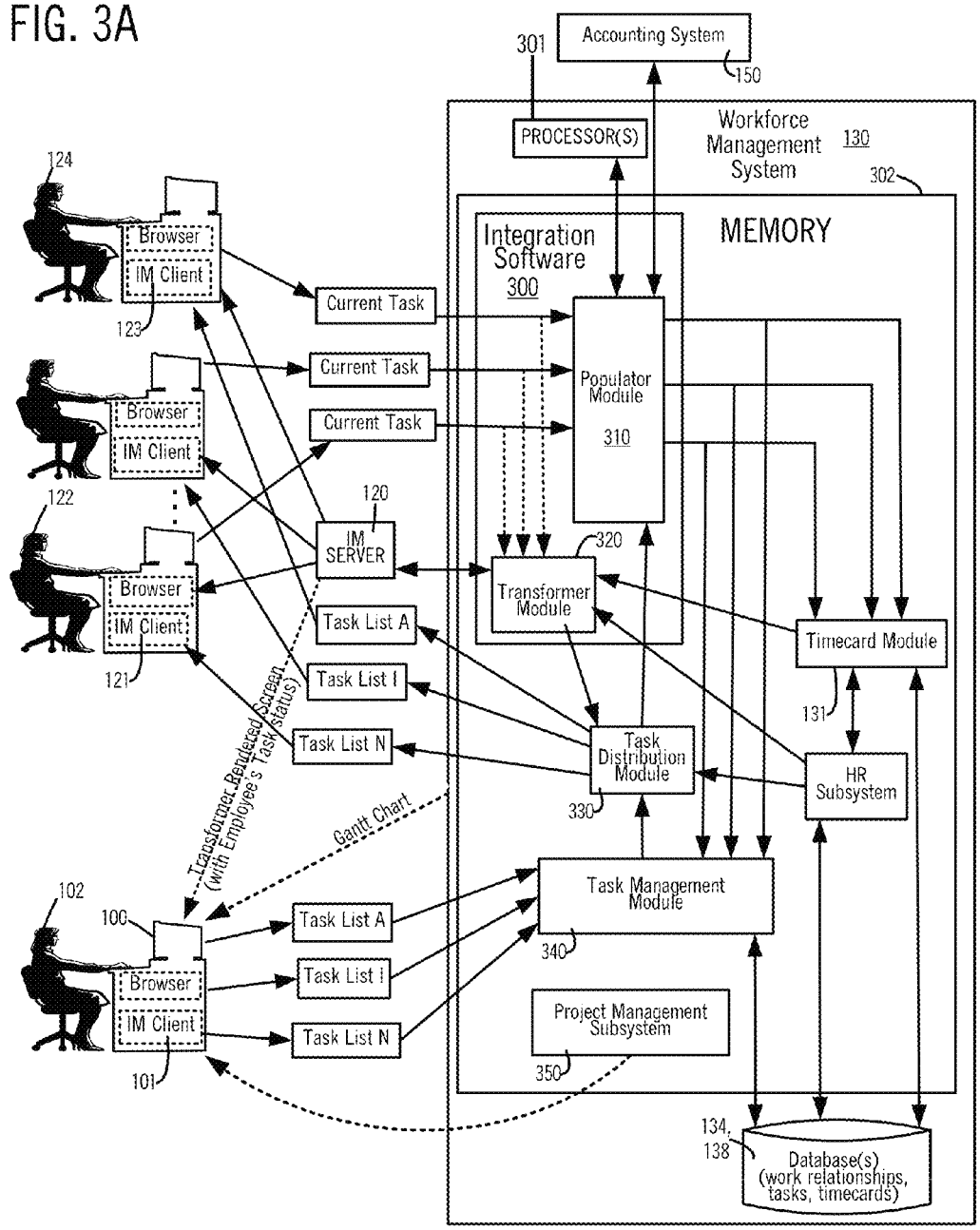
FIG. 3A illustrates, in a block diagram, data exchanged by Instant Messenger 101 and a workforce management system 130 in many embodiments of the invention.

In several embodiments of the type described above, employee 102 initially retrieves a project from a project management subsystem 350 in workforce management system 130 (FIG. 3A). Employee 102 then generates a number of tasks and allocates them to employees on their team, such as one or more of employees 122 . . . 124 (FIG. 3A). After tasks have been allocated by employee 102, computer 100 transmits the set of tasks I assigned to each employee I, to a task management module 340 in workforce management system 130 (FIG. 3A). Task management module 340 in turn supplies the tasks to a task distribution module 330 that in turn supplies a task list to the IM of the respective employee (e.g. task list A to employee A, task list I to employee I, etc). Employees 122 . . . 124 (FIG. 3A) select, in the respective instant messengers, a specific task identified their individual task list, as described above in reference to FIG. 2A.

A current task identified by user input from each of employees 122 . . . 124 is transmitted along with the current state (which is additionally selected by user input to be one of the timecard states) to workforce management system 130 (FIG. 3A). Specific messages which are generated by an Instant Messenger 123 (FIG. 3A) in response to user input from employee 123 are illustrated by a table (also referred to herein as Table B) shown in FIG. 3B. For example, as illustrated in the first row of Table B, at the time 9:02, employee 123 selects "Bug 2893386" as their current task. In response, Instant Messenger 123 generates a message to workforce management system 130 (FIG. 3A) which includes the following fields: "Bug 2893386", "21-Sept-2012 09:02:00", "Start", JoeSmith@Oracle.com. The fields may be comma separated in some embodiments of the message, although in other embodiments the fields are encoded in XML, as will be readily apparent in view of this description. Regardless of how encoded, message sent by IM 123 to workforce management system 130 in response to receipt of user input includes, in certain embodiments, the following information: an identification of a task selected by user input, a timestamp when the task selection occurred, a flag indicating the task is starting (or stopping), and an identity of the employee 123 that provided the user input. A sequence of such messages are transmitted to workforce management system 130 by IM 123 throughout a day, in response to receipt of user input, as shown in FIG. 3B.

In some embodiments, the messages from IM 123 (and similar messages from other IMs) are processed in workforce management system 130 by integration software 300 executed by one or more processors 301. Integration software 300 includes a populator module 310 that performs acts 311-317 illustrated in FIG. 4A to store a time entry and a task status. Integration software 300 also includes a transformer module 320 that performs acts 321-327 illustrated in FIG. 4B to prepare a buddy list for display to employee 102 (in Instant Messenger 101 of the type described above).

Figure 4A:
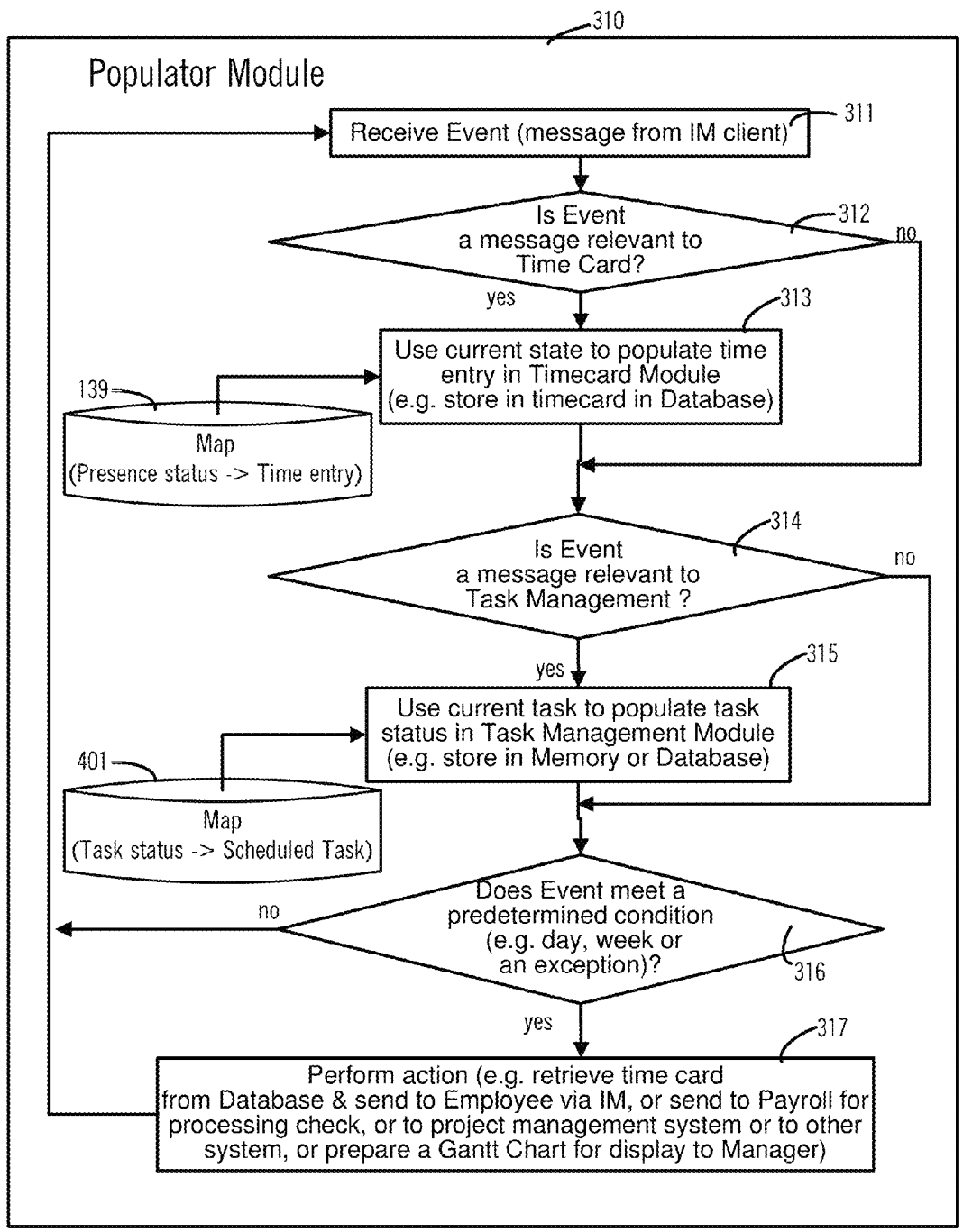
FIG. 4A illustrates, in a flow chart, acts performed by a populator module 310 which is included in integration software 300 of workforce management system 130 (FIG. 3A) in some embodiments.

Populator module 310 of some embodiments is designed to respond to multiple events, such as receipt of a message from Instant Messenger 101, as illustrated by act 311 in FIG. 4A. Next, in act 312, populator module 310 checks whether the event indicates receipt of a message that is relevant to preparation of a time card. If the answer in act 312 is yes, then populator module 310 uses a timecard state which is received as the current state, to prepare a time entry (as per act 313 in FIG. 4A), and supplies the time entry to timecard module 131, which in turn stores the time entry in a draft time card in database 134. In performing act 313, populator module 310 may use a map 139 to convert a presence status received in the message into a timecard state, in certain embodiments.

After performing act 313, populator module 310 goes to act 314. Populator module 310 also goes to act 314 if the answer in act 312 is no. In act 314, populator module 310 checks whether the event indicates receipt of a message that is relevant to task management. If the answer in act 314 is yes, then populator module 310 goes to act 315 and otherwise goes to act 316. In act 315, populator module 310 uses the current task which is received in the message, to populate the task status in task management module 340, which in turn stores the task in a relational database (e.g. which may include database 134 as shown in FIG. 3A). In performing act 315, populator module 310 may use a map 401 to convert a task status received in the message into a scheduled task, in certain embodiments. In act 316, populator module 310 checks whether the event meets a predetermined condition, such as an exception or a predetermined condition on the day or the week. If the answer in act 316 is yes, then populator module 310 goes to act 317 and otherwise returns to act 311 (described above).

In act 317, populator module 310 performs a predetermined action that is specific to the event. For example, if the event indicates user input to operate button 119 in IM 101, then populator module 310 retrieves the most-recent draft time card existing in the database, and sends the draft time card to IM 101 for display to employee 102 (e.g. as illustrated in FIG. 1E). Other such operations that may be performed in act 317 include retrieving one or more time cards from the database and supplying them to accounting system 150 for payment processing via a check, or sending task status to project management subsystem 350, or obtaining employee absence information from HR subsystem, or preparing a Gantt Chart for display to employee 102, etc. On completion of act 317, populator module 310 returns to act 311 (described above).

Figure 4B:
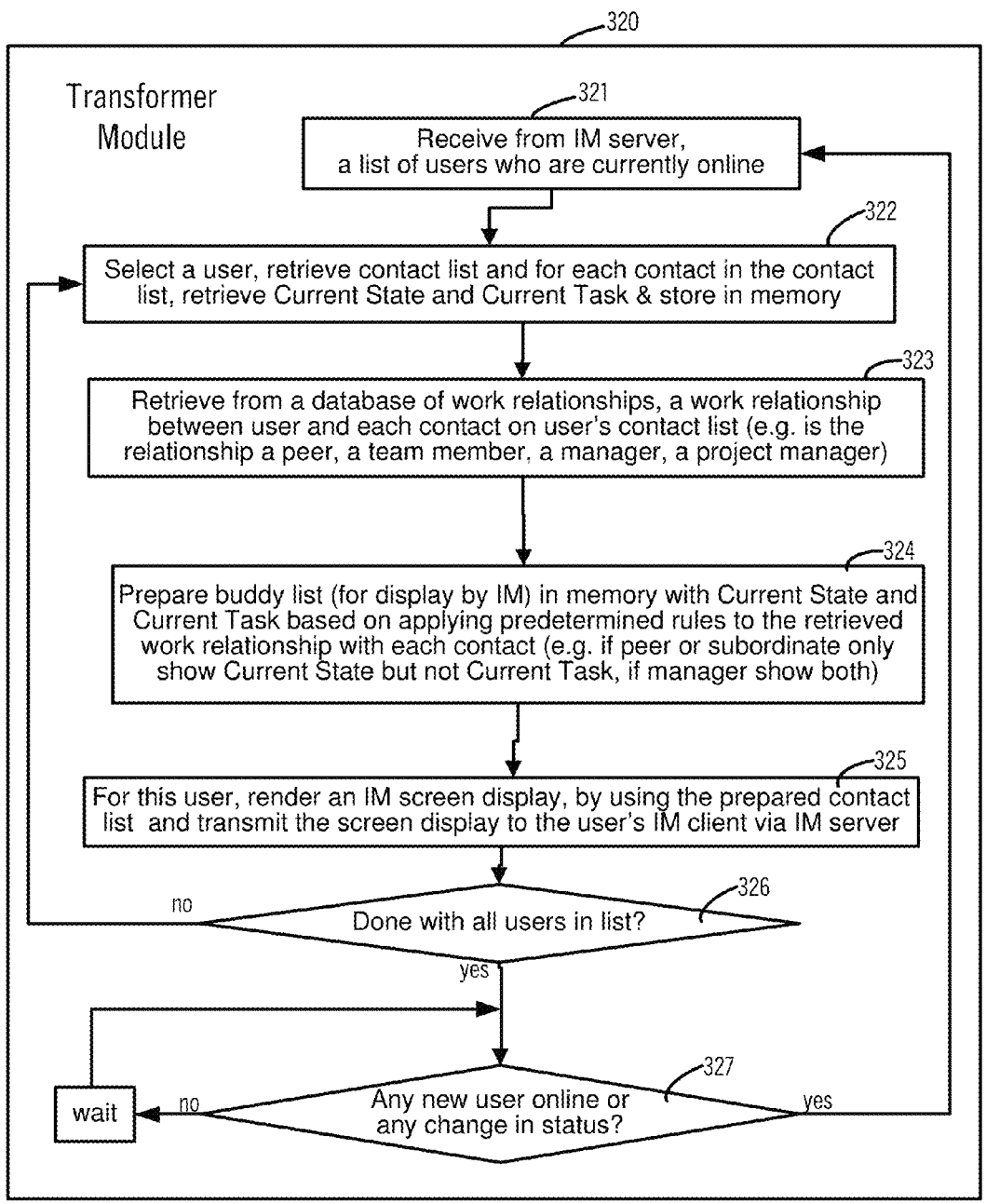
FIG. 4B illustrates, in a flow chart, acts performed by a transformer module 320 which is included in integration software 300 of workforce management system 130 (FIG. 3A) in some embodiments.

Transformer module 320 of some embodiments receives from IM server 120 (FIG. 3A), a list of all employees that are currently online, in an act 321 (FIG. 4B). Then transformer module 320 enters a loop to perform acts 322-326 (FIG. 4B) for each employee in the list, as follows. In act 322, transformer module 320 selects an employee as the current user, and retrieves the current user's buddy list 112, and then for each contact in the list 112 retrieves that contact's current state and current task, and stores them in memory 302 (such as a non-volatile memory of a computer).

Next, transformer module 320 goes to act 323 and retrieves from a relational database (e.g. which may include database 138 of work relationships as shown in FIG. 3A), the work relationship between the current user and each contact in the current user's buddy list 112. In some embodiments, the work relationship may have any one of a predetermined set of values, for example the set of values: peer, team member, manager, project manager.

Next, transformer module 320 goes to act 324 and prepares in computer memory 302, a buddy list for display by the IM of the current user. For example, transformer module 320 prepares a table with three columns, with one row for each contact of the current user. In the table, transformer module 320 stores the current state of the contact in a first column, the email address of the contact in the second column, and fills the third column based on one or more predetermined rules. Specifically, if the work relationship indicates that the current user is a subordinate or peer of the contact, then the third column is kept empty, but if the current user is a manager of the contact then the current task is filled in the third column.

Next, transformer module 320 goes to act 325 and renders in computer memory 302, a screen to be displayed by the IM of the current user, based on the table described in the immediately preceding paragraph above. Then transformer module 320 transmits the screen to the IM of the current user, via IM server 120. Next, transformer module 320 goes to act 326 and checks if all employees in the list (which is a list of all employees that are currently online) have been processed and if not returns to act 322 (described above). When all employees in the list have been processed, transformer module 320 goes from act 326 to act 327. In act 327, transformer module 320 check with IM server 120 whether any new employee is now online or if there is any change in the current state or the current task of any employee. If the answer in act 327 is yes, transformer module 320 returns to act 321. If the answer in act 327 is no then transformer module 320 waits for a predetermined amount of time, and then returns to act 327.

Integration software 300 in some embodiments includes computer instructions that when executed by a processor 301 (FIG. 3A) cause performance of a method of the type illustrated in FIG. 4C including acts 410-421 designed to support a browser-based Instant Messenger (or an IM client that simply displays screens and collects user input). Specifically, in an act 410, processor 301 receives a set of tasks which have been assigned to a current employee, from task distribution module 330, and goes to act 411. In act 411, processor 301 updates a task list in computer memory 302, and goes to act 412. In act 412, processor 301 receives a set of timecard states for the current employee (which includes one or more working timecard states and several non-working timecard states), and goes to act 413. Note that in some embodiments, the set of timecard states is identical for all employees, although in other embodiments each employee is associated with a specific set of timecard states. In act 413, processor 301 checks whether user input has been received, to view a timecard states list 110 and/or a tasks list 210 (see FIG. 2A). If the answer in act 413 is no, then processor 301 returns to act 410 (described above). If the answer in act 413 is yes, then processor 301 goes to act 414.

In act 414, processor 301 uses the set of tasks (received from task distribution module 330) and the set of timecard states (received from timecard module 131) to prepare a screen including lists 110 and 210, which screen is to be displayed by the IM of the current employee, transmits the screen to the current employee's IM, and then goes to act 415. Thus the current employee's IM receives the just-described screen (prepared in act 414) in combination with the above-described screen (prepared in act 324), and generates a display of the type illustrated in FIG. 2A (described above).

In act 415, processor 301 checks if user input has been received in the current employee's IM to select a specific task in the list 210 (FIG. 2A), and if so goes to act 419 but if not goes to act 416. In act 419, processor 301 records a change in the current state in memory 302, updates the task list 210 in memory 302 and goes to act 420. For example, processor 301 updates the task list 210 to indicate that a user-selected task has started or has completed (if completed, processor 301 removes the task from the task list of the current employee). In act 420, processor 301 renders a revised task list 210 and includes the timecard states list 110 in a screen that is prepared and transmitted in a manner similar or identical to act 414 (described above), and goes to act 421. In act 421, processor 301 sends a change in the current state and/or current task of the current employee to the IM server 120, and then returns to act 410 (described above).

In act 416 (which is performed on the "no" branch from act 415), processor 301 checks if user input selects a state in list 110 of timecard states and if not returns to act 413 (described above). If the answer is yes in act 416, processor 301 goes to act 417 and updates the current state based on the user input, and then goes to act 418. In act 418, processor 301 renders a screen, e.g. with the buddy list showing the current state 109 at the bottom thereof (see FIG. 2A), and goes to act 421 (described above).

Figure 4D:
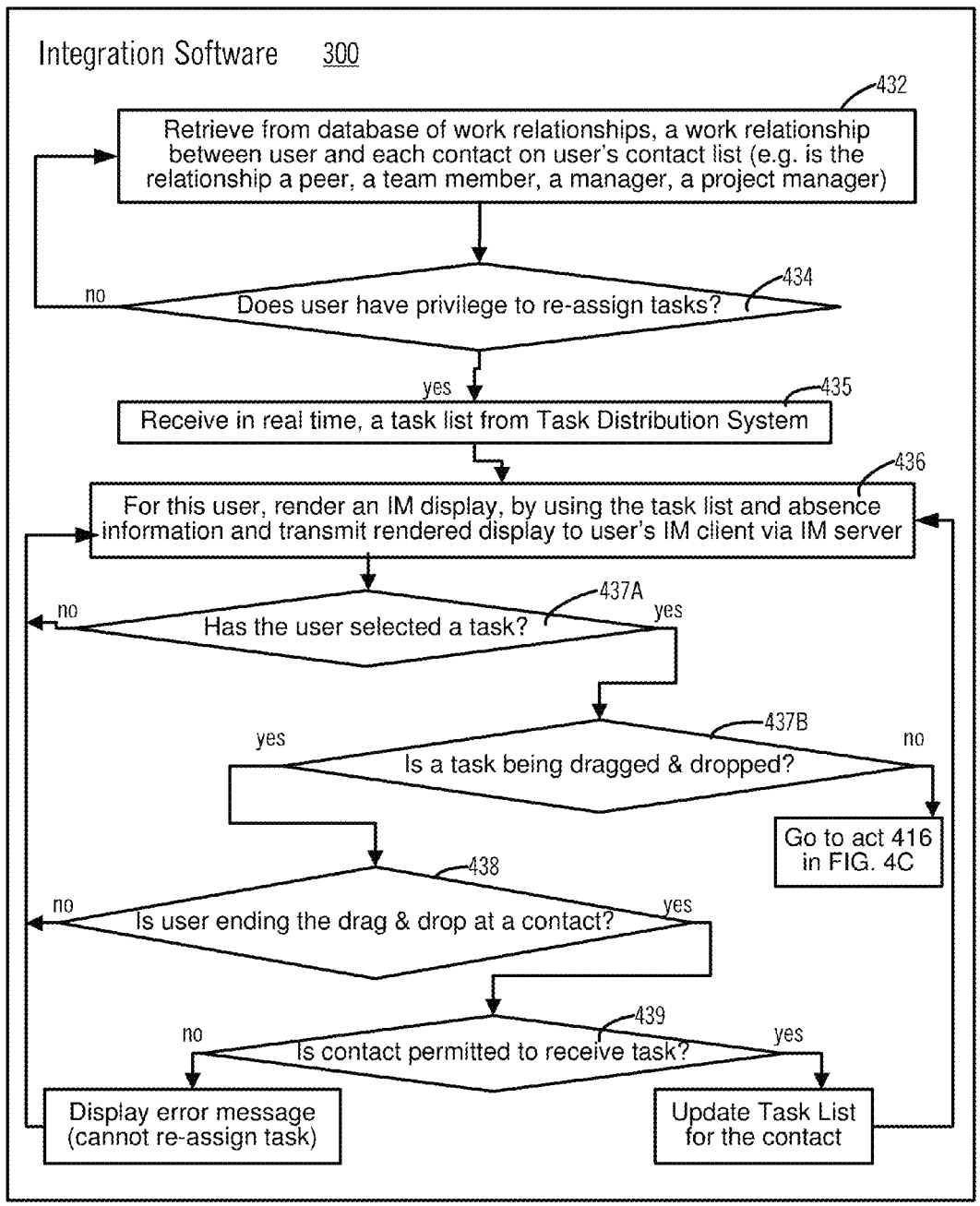

Integration software 300 in certain embodiments of the type described above in reference to FIG. 4C may optionally include additional computer instructions that when executed by the processor 301 (FIG. 3A) cause performance of acts 432-441 illustrated in FIG. 4D, designed to support a drag-and-drop operation of the type shown in FIG. 2G (described above). Specifically, in an act 432, processor 301 retrieves from database 138, work relationships between the current employee and each contact in the current employee's buddy list 112. Next, in act 433, processor 301 checks if the current employee has privilege to re-assign tasks, e.g. checks a table in database 138. If the answer in act 433 is no, processor 301 returns to act 432 (described above). If the answer in act 433 is yes, then processor 301 goes to act 434.

In act 434, processor 301 receives a set of tasks for the current employee from task distribution module 330 (FIG. 3A), and goes to act 435. In act 435, renders in memory 302, a screen to be displayed to the current employee, including lists 110 and 210 (FIG. 2A), by using a set of timecard states, a set of tasks and absence information, transmits the rendered screen to the current employee's IM via IM server 120, and goes to act 436. In act 436, processor 301 checks if the current employee has selected a specific task via user input, and if the answer is no, returns to act 435 (described above).

In act 436, if the answer is yes, processor 301 goes to act 437 and checks if the user input is a task re-assignment command (e.g. a drag-and-drop operation) on the selected task. If the answer in act 437 is no, processor 301 goes to act 416 (described above in reference to FIG. 4C). If the answer in act 437 is yes, processor 301 goes to act 438, and checks if the drag-and-drop operation ends at a contact in the buddy list 112. If the answer in act 438 is no, processor 301 returns to act 435 (described above). If the answer in act 438 is yes, processor 301 goes to act 439 to check if the contact (who is the target of the task re-assignment command) is permitted to receive the task. For example, processor 301 may check in act 439 whether the contact reports directly or indirectly to the current employee.

If the answer in act 439 is yes, processor 301 goes to act 441 and updates the task list for the contact (e.g. notifies task distribution module 330), and then returns to act 435 (described above). If the answer in act 439 is no, processor 301 goes to act 440, displays an error message, to notify the current employee that the task cannot be re-assigned (e.g. because the contact does not report to the current employee), and then goes to act 435 (described above).

Figure 5A:
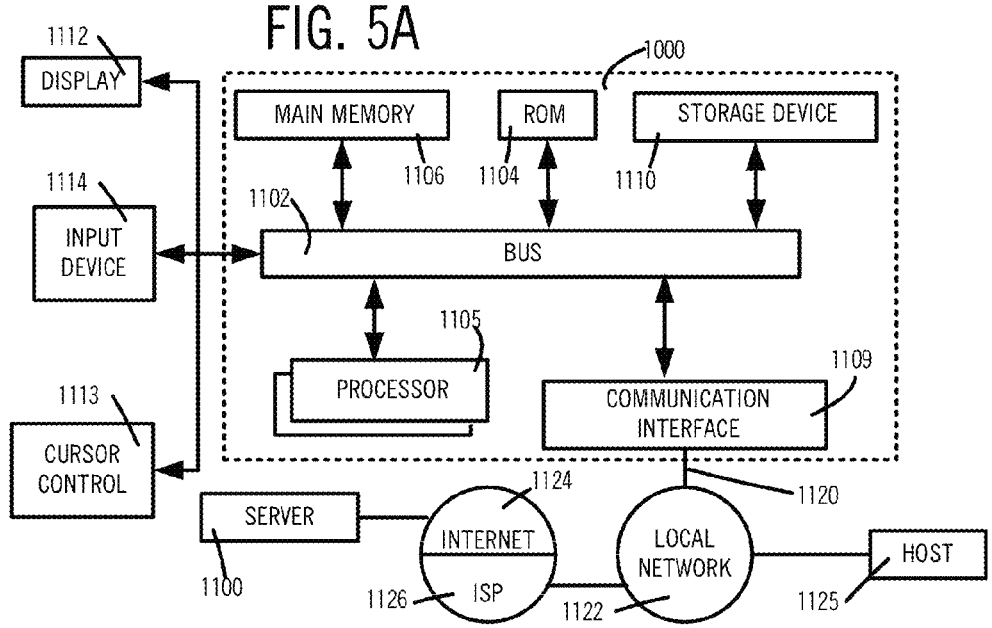
FIGS. 5A and 5B illustrate, in block diagrams, hardware and software portions of one or more computers that perform the methods illustrated in FIGS. 1F and 4A-4D.
Figure 5B:
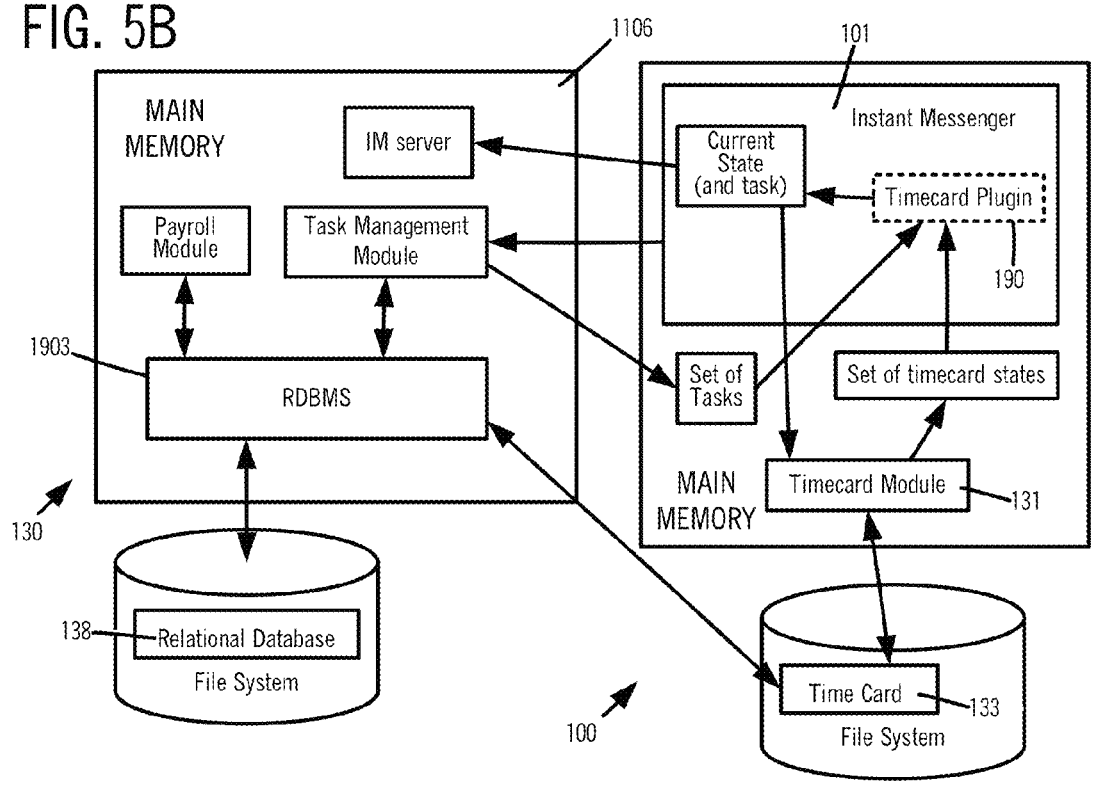

The methods of FIGS. 4A-4D and FIG. 1F may be used to program one or more computer(s) 1000 each of which may be implemented as illustrated in FIG. 5A which is discussed next. Moreover, computer 100 used by an employee 102 as well as workforce management system 130 may each be implemented to include one or more or all of the hardware components described in reference to computer 1000 below.

Specifically, computer 1000 includes a bus 1102 (FIG. 5A) or other communication mechanism for communicating information, and one or more processor(s) 1105 coupled with bus 1102 for processing information. Computer 1000 uses (as the above-described memory) a main memory 1106, such as a random access memory (RAM) or other dynamic storage device, coupled to bus 1102 for storing information and instructions (e.g. to perform the acts of FIGS. 4A-4D and FIG. 1F) to be executed by processor 1105.

Main memory 1106 (FIG. 5A) also may be used for storing temporary variables or other intermediate information during execution of instructions to be executed by processor 1105. Computer 1000 further includes a read only memory (ROM) 1104 or other static storage device coupled to bus 1102 for storing static information and instructions for processor 1105, such as software in the form of a browser, an instant messenger, timecard module, task management module and/or integration software. A storage device 1110, such as a magnetic disk or optical disk, is provided and coupled to bus 1102 for storing information and instructions.

Computer 1000 (FIG. 5A) may be coupled via bus 1102 to a display device or video monitor 1112 such as a cathode ray tube (CRT) or a liquid crystal display (LCD), for displaying information to a computer user (e.g. a store manager) may be displayed on display 1112. An input device 1114, including alphanumeric and other keys (e.g. of a keyboard), is coupled to bus 1102 for communicating information (such as user input) to processor 1105. Another type of user input device is cursor control 1116, such as a mouse, a trackball, or cursor direction keys for communicating information and command selections to processor 1105 and for controlling cursor movement on display 1112. This input device typically has two degrees of freedom in two axes, a first axis (e.g., x) and a second axis (e.g., y), that allows the device to specify positions in a plane. In addition to display device 1112, computer 1000 may include a speaker (not shown) as another output device for use by processor 1105.

As described elsewhere herein, a workforce management system 130 may be implemented by computer 1000 (FIG. 5A) in response to processor 1105 executing one or more sequences of one or more instructions that are contained in main memory 1106. Such instructions may be read into main memory 1106 from another non-transitory computer-readable storage medium, such as storage device 1110. Execution of the sequences of instructions contained in main memory 1106 causes processor 1105 to perform the operations of a process described herein and illustrated in FIGS. 4A-4D and FIG. 1F. In alternative embodiments, hard-wired circuitry may be used in place of or in combination with software instructions.

The term "non-transitory computer-readable storage medium" as used herein refers to any non-transitory storage medium that participates in providing instructions to processor 1105 for execution. Such a non-transitory storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110, to store program code in the form of instructions and/or data structures and that can be accessed by computer 1000. Volatile storage media includes dynamic memory, such as main memory 1106 which may be implemented in the form of a random access memory or RAM.

Instructions to processor 1105 can be provided by a transmission link or by a non-transitory storage medium from which a computer can read information, such as data and/or code. Specifically, various forms of transmission link and/or non-transitory storage medium may be involved in providing one or more sequences of one or more instructions to processor 1105 for execution. For example, the instructions may initially be comprised in a non-transitory storage device, such as a magnetic disk, of a remote computer. The remote computer can load the instructions into its dynamic memory (RAM) and send the instructions over a telephone line using a modem.

A modem local to computer 1000 (FIG. 5A) can receive information about a change to a collaboration object on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer 1000 (FIG. 5A) also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 (FIG. 5A) typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer 1000, are exemplary forms of carrier waves transporting the information.

Computer 1000 (FIG. 5A) can send messages and receive data, including program code, through the network(s), network link 1120 and communication interface 1115. In the Internet example, a server 1100 might transmit information retrieved from RDBMS database through Internet 1124, ISP 1126, local network 1122 and communication interface 1115. The instructions for performing the operations or acts of FIGS. 4A-4D and FIG. 1F may be executed by processor 1105 as they are received, and/or stored in storage device 1110, or other non-volatile storage for later execution. In this manner, computer 1000 may additionally or alternatively obtain instructions and any related data in the form of a carrier wave.

Note that FIG. 5A is a very low-level representation of many hardware components of a computer system. Several embodiments have one or more additional software components in main memory 1106 as shown in FIG. 5B. In addition to main memory 1106, computer 1000 may include one or more other types of memory such as flash memory (or SD card) and/or a hard disk and/or an optical disk (also called "secondary memory") to store data and/or software for loading into memory 1106 (also called "main memory") and/or for use by processor(s) 1105. In some embodiments, computer 1000 of FIG. 5A implements a relational database management system 1903 to manage data in one or more tables of a relational database 1901 of the type illustrated in FIG. 5B. Such a relational database management system 1903 may manage a distributed database system that includes multiple databases, each table being stored on different storage mechanisms.

In some embodiments, the multiple databases are made to appear as a single database. In such embodiments, processor 1105 can access and modify the data in a relational database 1903 (which may include databases 134 and 138) via RDBMS 1903 that accepts queries in conformance with a relational database language, the most common of which is the Structured Query Language (SQL). The commands are used by processor 1105 of some embodiments to store, modify and retrieve data about an application program in the form of rows in a table in relational database 138. Relational database management system 1903 further includes output logic that makes the data in a database table available to a user via a graphical user interface that generates a screen on a video monitor display 1112. In one example, the output logic of computer 1000 provides results via a web-based user interface that depicts in a browser, information related to selection of timecard states and tasks in an Instant Messenger as illustrated in FIGS. 1A, 1B, 1C, 1E, 1G and 2A-2H. Additionally and/or alternatively, screens responsive to a command in a command-line interface and display on a video monitor may be generated by computer 1000.

In some embodiments of computer 1000, functionality in the above-described operations or acts of FIGS. 4A-4D and FIG. 1F is implemented by processor 1105 executing software in memory 1106 of computer 1000, although in other embodiments such functionality is implemented in any combination of hardware circuitry and/or firmware and/or software in computer 1000. Depending on the embodiment, various functions of the type described herein may be implemented in software (executed by one or more processors or processor cores) or in dedicated hardware circuitry or in firmware, or in any combination thereof. Accordingly, depending on the embodiment, any one or more of the means for performing operations or acts of FIGS. 4A-4D and FIG. 1F can, but need not necessarily include, one or more microprocessors, embedded processors, controllers, application specific integrated circuits (ASICs), digital signal processors (DSPs), multi-core processors and the like.

Any non-transitory computer readable medium tangibly embodying software (also called "computer instructions") may be used in implementing one or more acts or operations described herein and illustrated in FIGS. 4A-4D and FIG. 1F. Such software may include program codes stored in memory 1106 and executed by processor 1105. Memory 1106 may be implemented within or external to processor 1105, depending on the embodiment. When implemented in firmware and/or software, logic to perform one or more acts or operations of FIGS. 4A-4D and FIG. 1F may be stored as one or more computer instructions or code on a non-transitory computer-readable medium.

In some embodiments, a computer 1000 may include multiple processors, each of which is programmed with software in a memory 1106 shared with each other to perform acts of the type described above to implement the individual modules illustrated in FIG. 3A. For example, a first processor 1105 in computer 1000 may be programmed with software in memory 1106 to implement a populator module 310. A second processor 1105 in computer 1000 may be programmed with software in memory 1106 to implement a transformer module 320. A third processor 1105 in computer 1000 may be programmed with software in memory 1106 to implement a timecard module 131. A fourth processor 1105 in computer 1000 may be programmed with software in memory 1106 to implement a task management module 340. A fifth processor 1105 in computer 1000 may be programmed with software in memory 1106 to implement a task distribution module 330.

Although five processors 1105 have been just described for some embodiments to implement the respective means, in other embodiments a single processor 1105 may be used in a time shared manner to implement the just-described means of the previous paragraph. Furthermore, in still other embodiments, one processor 1105 may be used in a time-shared manner to implement one or more parts of various modules. Furthermore, although processors 1105 have been described above for certain embodiments as being included in a single computer 1000, in other embodiments multiple such processors 1105 may be included in multiple computers 1000, for example five computers 1000 may implement the five modules described above. Additionally, in one or more such embodiments, one or more processor(s) 1105 with a bus 1103 implement an instant messenger 102 in computer 100.

Numerous modifications and adaptations of the embodiments described herein will become apparent to the skilled artisan in view of this disclosure. Numerous modifications and adaptations of the embodiments described herein are encompassed by the attached claims.

The invention claimed is:

1. A computer-implemented method comprising:
    displaying, in an Instant Messenger (IM) logged into by a current user, a set of states in which each state is selectable by user input, the set of states comprising a first state identifying the current user in a first type of time period and multiple second states identifying the current user in a second type of time period;
    receiving in the IM, user input identifying a specific state selected from among the set of states to be a current state of the current user;
    receiving in the IM, further user input identifying a specific task selected from among a set of tasks, as a current task of the current user;
    selectively transmitting an identification of the current task only to first users but not to second users, the first users and the second users being identified in the IM as buddies of the current user, the first users being determined based on meeting a test on relationships identifying a hierarchy of said users;
    creating a draft set of records for the current user, by using a first time at which the current state is set by user input in the IM to the first state as a time of occurrence of a clock-in event in tracking of time, and by using a second time at which the current state is set by user input in the IM to a second state selected from among the multiple second states as a time of occurrence of a clock-out event in said tracking of time;
    displaying the draft set of records, the draft set of records identifying in a given day several periods of the second type interleaved between a plurality of periods of the first type, at least one period in the several periods of the second type being identified to be in the second state and at least one period of the first type in the plurality of periods being identified to be in the first state;
    receiving additional user input indicative of zero or more changes to any periods displayed in the draft set of records;
    storing the draft set of records after applying any changes, in a non-transitory computer readable storage medium, as a finalized set of records; and
    transmitting the finalized set of records to another computer system;
    prior to the selective transmission of the identification of the current task, using the relationships to identify at least the first users and at least the second users;
    wherein at least one of the first users is identified by a relationship, to whom reports directly the current user that is logged into the IM; and
    wherein at least one of the second users is identified by another relationship, as reporting directly to the current user that is logged into the IM.

2. The computer-implemented method of claim 1 further comprising:
    displaying in a buddy list in the IM logged into by the current user:
    the current state and the current task of said at least one of the second users; and
    the current state but not the current task of said at least one of the first users.

3. The computer-implemented method of claim 1 further comprising:
    removing a selected task from the set of tasks displayed in the IM logged into by the current user and adding said selected task to another set of tasks of said at least one of the second users.

4. The computer-implemented method of claim 1 wherein:
    the first state is set as the current state in response to the current user logging into the IM.

5. The computer-implemented method of claim 1 wherein:
    the set of states is displayed in a list; and
    an additional state not displayed in the list is transmitted, based on retrieving from a database, information indicative of absence of the current user.

6. The computer-implemented method of claim 1 further comprising:
    receiving an approval command from said at least one of the first users prior to transmission of the finalized set of records.

7. The computer-implemented method of claim 1 further comprising:
    said another computer system computing and storing in one or more non-transitory computer-readable storage media, to-be-printed information specific to the current user that is logged into the IM, based at least on a plurality of periods identified in the finalized set of records.

8. One or more non-transitory computer-readable storage media comprising a plurality of instructions that when executed by one or more processors cause the one or more processors to perform a computer-implemented method, the plurality of instructions comprising:
    instructions to display in an Instant Messenger (IM) logged into by a current user, a set of states in which a current state is selectable by user input to the IM;
    wherein the set of states comprises a first state identifying the current user in a first type of time period and multiple second states identifying the current user in a second type of time period;
    instructions to receive in the IM, user input identifying a specific state selected from among the set of states to be a current state of the current user;
    instructions to receive in the IM, further user input identifying a specific task selected from among a set of tasks, as a current task of the current user;
    instructions to selectively transmit an identification of the current task only to first users but not to second users, the first users and the second users being identified in the IM as buddies of the current user, the first users being determined based on meeting a test on relationships identifying a hierarchy of said users;

instructions to prepare a draft set of records for the current user, by using a first time at which the current state is set to the first state in the IM as a time of occurrence of a clock-in event in tracking of time, and by using a second time at which the current state is set in the IM to a second state selected from among the multiple second states as a time of occurrence of a clock-out event in the tracking of time;

instructions to display the draft set of records, wherein the draft set of records identifies in a given day several periods of the second type interleaved between a plurality of periods of the first type, at least one period in the several periods of the second type being identified to be in the second state and at least one period of the first type in the plurality of periods being identified to be in the first state;

instructions to finalize the draft set of records, based on additional user input identifying zero or more changes to any of the periods displayed in the draft set of records, to obtain a finalized set of records of the employee;

instructions to submit the finalized set of records of the current user, to another computer system; and instructions, to be executed prior to the selective transmission of the identification of the current task, to use the relationships to identify at least the first users and at least the second users;

wherein at least one of the first users is identified by a relationship, to whom reports directly the current user that is logged into the IM; and wherein at least one of the second users is identified by another relationship, as reporting directly to the current user that is logged into the IM.

9. The one or more non-transitory computer-readable storage media of claim 8 wherein the plurality of instructions further comprise:

instructions to display in the IM logged into by the current user:

the current state and the current task of said at least one of the second users; and the current state but not the current task of said at least one of the first users.

10. The one or more non-transitory computer-readable storage media of claim 8 wherein the plurality of instructions further comprise:

instructions to remove a selected task from the set of tasks displayed in the IM logged into by the current user and adding said selected task to another set of tasks of said at least one of the second users.

11. The one or more non-transitory computer-readable storage media claim 8 wherein:

the first state is set as the current state in response to the current user logging into the IM.

12. The one or more non-transitory computer-readable storage media of claim 8 wherein the plurality of instructions further comprise:

instructions to transmit an additional state not displayed in the list, based on retrieving from a database, said information indicative of absence of the current user.

13. The one or more non-transitory computer-readable storage media of claim 8 wherein the plurality of instructions further comprise:

instructions to receive an approval command from said at least one of the first users prior to transmission of the finalized set of records.

14. The one or more non-transitory computer-readable storage media of claim 8 wherein the employee that is logged into the IM is hereinafter referred to as a given employee, and wherein the plurality of instructions further comprise:

instructions to said another computer system to compute and store in one or more non-transitory computer-readable storage media, to-be-printed information specific to the current user, based at least on a plurality of periods identified in the finalized set of records.

15. An apparatus comprising one or more computer memories coupled to one or more processors, the one or more processors being configured to execute instructions in the one or more computer memories to:

display in an Instant Messenger (IM) logged into by a current user, a set of states in which each state is selectable by user input, the set of states comprising a first state identifying the current user in a first type of time period and multiple second states identifying the current user in a second type of time period;

receive in the IM, user input identifying a specific state selected from among the set of states to be a current state of the current user;

receive in the IM, further user input identifying a specific task selected from among a set of tasks, as a current task of the current user;

selectively transmit an identification of the current task only to first users but not to second users, the first users and the second users being identified in the IM as buddies of the current user, the first users being determined based on meeting a test on relationships identifying a hierarchy of said users;

create a draft set of records for the current user, by using a first time at which the current state is set by user input in the IM to the first state as a time of occurrence of a clock-in event in tracking of time, and by using a second time at which the current state is set by user input in the IM to a second state selected from among the multiple second states as a time of occurrence of a clock-out event in said tracking of time;

display the draft set of records, the draft set of records identifying in a given day several periods of the second type interleaved between a plurality of periods of the first type, at least one period in the several periods of the second type being identified to be in the second state and at least one period of the first type in the plurality of periods being identified to be in the first state;

receive additional user input indicative of zero or more changes to any periods displayed in the draft set of records;

store the draft set of records after applying any changes, in a non-transitory computer readable storage medium, as a finalized set of records; and transmit the finalized set of records to another computer system;

prior to the selective transmission of the identification of the current task, use the relationships to identify at least the first users and at least the second users;

wherein at least one of the first users is identified by a relationship, to whom reports directly the current user that is logged into the IM; and wherein at least one of the second users is identified by another relationship, as reporting directly to the current user that is logged into the IM.

16. The apparatus of claim 15 wherein the one or more processors are further configured to:

display in the IM logged into by the user:

the current state and the current task of said at least one of the second users; and the current state but not the current task of said at least one of the first users.

* * * * *

UNITED STATES PATENT AND TRADEMARK OFFICE
CERTIFICATE OF CORRECTION

PATENT NO. : 9,792,590 B2
APPLICATION NO. : 14/029561
DATED : October 17, 2017
INVENTOR(S) : Niazi It is certified that error appears in the above-identified patent and that said Letters Patent is hereby corrected as shown below:

In the Claims

In Column 25, Line 56, in Claim 11, after "media" insert -- of --.

In Column 25, Line 63, in Claim 12, after "database," delete "said".

In Column 26, Line 66, in Claim 15, after "directly" insert -- to --.

In Column 27, Line 6, in Claim 16, before "user:" insert -- current --.

Signed and Sealed this
Fifth Day of June, 2018

Andrei Iancu
*Director of the United States Patent and Trademark Office*